(12) United States Patent
Tsuchiya et al.

(10) Patent No.: US 7,234,635 B2
(45) Date of Patent: Jun. 26, 2007

(54) TRANSACTION DEGRADATION PROCESSING METHOD FOR AUTOMATED TRANSACTION APPARATUS, SYSTEM FOR SAME, AND ADMINISTRATION SERVER FOR SAME

(75) Inventors: Shinichiro Tsuchiya, Maebashi (JP); Satoshi Tomi, Inagi (JP); Hiroaki Yamashita, Inagi (JP); Shogo Kawabata, Inagi (JP); Tomohiro Kamimura, Inagi (JP)

(73) Assignees: Fujitsu Limited, Kawasaki (JP); Fujitsu Frontech Limited, Inagi (JP)

( * ) Notice: Subject to any disclaimer, the term of this patent is extended or adjusted under 35 U.S.C. 154(b) by 296 days.

(21) Appl. No.: 10/984,800

(22) Filed: Nov. 10, 2004

(65) Prior Publication Data

US 2005/0199701 A1 Sep. 15, 2005

(30) Foreign Application Priority Data

Mar. 10, 2004 (JP) ............................. 2004-067656

(51) Int. Cl.
  G06Q 40/00 (2006.01)
  G07D 11/00 (2006.01)
  G07F 19/00 (2006.01)
(52) U.S. Cl. .................... 235/379; 235/375; 705/43
(58) Field of Classification Search ................ 235/379, 235/375, 381, 487; 705/43; 902/8
  See application file for complete search history.

(56) References Cited

U.S. PATENT DOCUMENTS

| 6,477,559 | B1 * | 11/2002 | Veluvali et al. ............. 718/101 |
| 7,039,166 | B1 * | 5/2006 | Peterson et al. ......... 379/88.18 |
| 2002/0133461 | A1 * | 9/2002 | Ramachandran ............. 705/43 |
| 2002/0153415 | A1 * | 10/2002 | Minami et al. ............. 235/380 |
| 2005/0109832 | A1 * | 5/2005 | Izawa et al. ................ 235/379 |
| 2005/0199702 | A1 * | 9/2005 | Yamauchi ................... 235/379 |

FOREIGN PATENT DOCUMENTS

| JP | 2000-298752 | 10/2000 |
| JP | 2002-278712 | 9/2002 |
| KR | 2001-0108592 | 12/2001 |
| KR | 2001-0108866 | 12/2001 |

\* cited by examiner

*Primary Examiner*—Thien M. Le
*Assistant Examiner*—Edwyn Labaze
(74) *Attorney, Agent, or Firm*—Staas & Halsey LLP

(57) ABSTRACT

A transaction degradation processing method to decide available transactions of automated transaction apparatus easily executes transaction degradation processing for a plurality of automated transaction apparatus installations. An administration server is connected with a plurality of the automated transaction apparatus and performs transaction degradation processing for a plurality of installations of automated transaction apparatus by using a database. There is no longer a need for separately installing programs and tables in each of automated transaction apparatus installations, modification of the table specifications is facilitated, and program maintainability is improved.

21 Claims, 20 Drawing Sheets

FIG. 5

| TRANSACTION SERVICE | OPERATING MODE | | | | | |
| --- | --- | --- | --- | --- | --- | --- |
| | WITHDRAWAL STOP | DEPOSIT STOP | BOOK STOP | PAYMENT STOP | COIN STOP | CHANGE STOP |
| CARD WITHDRAWAL | × | ○ | ○ | ○ | ○ | ○ |
| COMPOSIT WITHDRAWAL | × | ○ | × | ○ | ○ | ○ |
| CARD DEPOSIT | ○ | × | ○ | ○ | ○ | ○ |
| PASSBOOK DEPOSIT | ○ | × | × | ○ | ○ | ○ |
| BOOK | ○ | ○ | × | ○ | ○ | ○ |
| BALANCE | ○ | ○ | ○ | ○ | ○ | ○ |
| CHANGE | ○ | ○ | × | ○ | ○ | × |
| CASH PAYMENT(INPUT KEY) | × | × | ○ | × | × | ○ |
| CASH PAYMENT (PAYMENT CARD) | × | × | ○ | × | × | ○ |
| ACCOUNT PAYMENT (INPUT KEY) | ○ | ○ | ○ | × | ○ | ○ |
| ACCOUONT PAYMENT (PAYMENT CARD) | ○ | ○ | ○ | × | ○ | ○ |
| CASHING | × | ○ | ○ | ○ | ○ | ○ |
| CASHING INQUIRE | ○ | ○ | ○ | ○ | ○ | ○ |
| CASHING PAY BACK | ○ | × | ○ | ○ | ○ | ○ |

○ : POSSIBLE SERVICE
× : UNPOSSIBLE SERVICE

FIG. 6

| NOTICE CONTENTS | STATUS | | | |
|---|---|---|---|---|
| FULL | SENSOR FULL DETECT OR OVER THE NUMBER OF FULL | | | |
| SECONDARY NEAR FULL | THE NUMBER OF FULL — THE NUMBER OF DEPOSIT LIMIT | | | |
| PRIMARY NEAR FULL | THE NUMBER OF FULL — 400 SHEET | | | |
| NORMAL | | | | |
| PRIMARY NEAR END | UNDER THE NUMBER OF NEAR END NOTICE | | | |
| SECONDARY NEAR END | UNDER THE NUMBER OF WITHDRAWAL LIMIT | | | |
| EMPTY | SENSOR EMPTY DETECT OR NO SHEET | | | |
| THE NUMBER OF FULL | 10000 SHEET | THE NUMBER OF DEPOSIT LIMIT | 200 SHEET | |
| THE NUMBER OF NEAR END NOTICE | TEN THOUSAND YEN : 200 SHEET, THOUSAND YEN : 20 SHEET | | | |
| THE NUMBER OF WITHDRAWAL LIMIT | TEN THOUSAND YEN: 30 SHEET, THOUSAND YEN : 8 SHEET | | | |

FIG. 7

| NOTICE CONTENTS | STATUS | | | |
|---|---|---|---|---|
| FULL | SENSOR FULL DETECT OR OVER THE NUMBER OF FULL | | | |
| PRIMARY NEAR END | UNDER THE NUMBER OF NEAR END NOTICE | | | |
| EMPTY | SENSOR EMPTY DETECT OR NO SHEET | | | |
| THE NUMBER OF FULL | 1200 SHEET | THE NUMBER OF NEAR END NOTICE | 20 SHEET | |

FIG. 8

| DETAILED OPERATION | MEDIUM END | | | | | MEDIUM FULL | | | | |
|---|---|---|---|---|---|---|---|---|---|---|
| | RECEIPT | PAYMENT CARD | MEDIUM NEAR END STATUS (TEN THOUSAND YEN BILL) SECONDARY NEAR END | MEDIUM NEAR END STATUS (THOUSAND YEN BILL) SECONDARY NEAR END | MEDIUM NEAR END STATUS (COIN) PRIMARY NEAR END | PASSBOOK TAKE-IN | MEDIUM FULL STATUS (BILL COLLECT) | MEDIUM FULL STATUS (COIN COLLECT) | MEDIUM FULL STATUS (BILL REJECT) | MEDIUM FULLSTATUS (COIN REJECT) |
| CARD WITHDRAWAL | × | ○ | × | △ | ○ | ○ | ○ | ○ | × | ○ |
| COMPOSIT WITHDRAWAL | × | ○ | × | △ | ○ | × | ○ | ○ | × | ○ |
| CARD DEPOSIT | × | ○ | ○ | ○ | ○ | ○ | × | ○ | × | ○ |
| PASSBOOK DEPOSIT | × | ○ | ○ | ○ | ○ | × | × | ○ | × | ○ |
| BOOK | ○ | ○ | ○ | ○ | ○ | × | ○ | ○ | × | ○ |
| BALANCE | × | ○ | ○ | ○ | ○ | ○ | ○ | ○ | × | ○ |
| CHANGE | × | ○ | ○ | ○ | ○ | × | ○ | ○ | × | ○ |
| CASH PAYMENT (INPUT KEY) | × | □ | ○ | × | × | ○ | × | × | × | × |
| CASH PAYMENT (PAYMENT CARD) | × | ○ | ○ | × | × | ○ | × | × | × | × |
| ACCOUNT PAYMENT (INPUT KEY) | × | □ | ○ | ○ | ○ | ○ | ○ | ○ | × | ○ |
| ACCOUNT PAYMENT (PAYMENT CARD) | × | ○ | ○ | ○ | ○ | ○ | ○ | ○ | × | ○ |
| CASHING | × | ○ | × | △ | ○ | ○ | ○ | ○ | × | ○ |
| CASHING INQUIRE | × | ○ | ○ | ○ | ○ | ○ | ○ | ○ | × | ○ |
| CASHING PAY BACK | × | ○ | ○ | × | ○ | ○ | × | ○ | × | ○ |

FIG. 9

| REDUCTION TARANSACTION | REDUCTION CONDITION |
|---|---|
| REDUCTION OF ALL TRANSACTION | 1. NON-CONNECT, FAULTY OCCURRENCE, SET ERROR OF JOURNAL UNIT AND UNABLE TO USE ELECTRONIC JOURNAL<br>2. MASTER / SLAVE DISK ERROR<br>3. NON-CONNECT OF AT LEAST ONE OF BILL UNIT, CARD UNIT AND RECEIPT UNIT<br>4. FAULTY OCCURRENCE OF AT LEAST ONE OF BILL UNIT, CARD UNIT AND RECEIPT UNIT<br>5. SET ERROR OF AT LEAST ONE OF BILL UNIT, CARD UNIT AND RECEIPT UNIT<br>6. INTERNAL /LOGICAL RESERVATION OF AT LEAST ONE OF BILL UNIT, CARD UNIT AND RECEIPT UNIT |
| REDUCTION OF BOOK TRANSACTION | 1. NON-CONNECT OF PASSBOOK UNIT<br>2. FAULTY OCCURRENCE OF PASSBOOK UNIT<br>3. SET EEROR OF PASSBOOK UNIT<br>4. INTERNAL / LOGICAL RESERVATION OF PASSBOOK UNIT |

| TRANSACTION KEY | TRANSACTION SERVICE | OPERATION MODE 60 ||||||||
|---|---|---|---|---|---|---|---|---|
| | | DEPOSIT || WITHDRAWAL ||| BALANCE || ACCOUNT PAYMENT |
| | | CARD DEPOSIT STOP | CREDIT PAY BACK STOP | CARD WITHDRAWAL STOP | CREDIT RENTAL STOP | PAYMENT AFTER BALANCE STOP | BALANCE STOP | CREDIT BALANCE STOP | ACCOUNT PAYMENT STOP |
| WITHDRAWAL | CARD WITHDRAWAL | ○ | ○ | × | ○ | ○ | ○ | ○ | ○ |
| | CASHING | ○ | ○ | × | × | ○ | ○ | ○ | ○ |
| DEPOSIT | CARD DEPOSIT | × | ○ | ○ | ○ | ○ | ○ | ○ | ○ |
| | CASHING PAY BACK | × | × | ○ | ○ | ○ | ○ | ○ | ○ |
| BALANCE | CARD BALANCE | ○ | ○ | ○ | ○ | ○ | × | ○ | ○ |
| | CASHING BALANCE | ○ | ○ | × | ○ | ○ | × | × | ○ |
| | CONTINUOS CARD WITHDRAWAL | ○ | ○ | ○ | ○ | × | ○ | ○ | ○ |
| CASH PAYMENT | ACCOUNT PAYMENT | ○ | ○ | ○ | ○ | ○ | ○ | ○ | × |

○ : POSSIBLE SERVICE
× : UN POSSIBLE SERVICE

FIG. 19

| UNIT (MEDIUM) | END | FULL |
|---|---|---|
| RECEIPT | SENSOR | — |
| CARD TAKE-IN UNIT | — | OVER TWENTY |
| RECYCLE UNIT : TEN TOUSAND YEN BILL | UNDER TWENTY ONE or SENSOR | OVER 200 or SENSOR DETECT |
| RECYCLE UNIT : TOUSAND YEN BILL | UNDER NINE or SENSOR | OVER 500 or SENSOR DETECT |
| RECYCLE UNIT : COLLECTOR | ZERO | OVER 2000 or SENSOR DETECT |
| RECYCLE UNIT : REJECT PART | ZERO | OVER 100 or SENSOR DETECT |
| WITHDRAWAL UNIT · UPPER/LOWER STACKER (TEN THOUSAND YEN BILL) | UNDER TWENTY ONE | OVER 1500 |
| WITHDRAWAL UNIT · UPPER/LOWER STACKER (THOUSAND YEN BILL) | UNDER NINE | OVER 1500 |
| WITHDRAWAL UNIT · UPPER/LOWER REJECT | ZERO | OVER TWENTY |

FIG. 20

| | | CARD WITHDRAWAL | CASHING | CARD DEPOSIT | CASHING PAY BACK | CARD BALANCE | CACHING BALANCE | CONTINUOS CARD WITHDRAWAL | ACCOUT PAYMENT |
|---|---|---|---|---|---|---|---|---|---|
| MEDIUM FULL | ↓ REJECT | ◀4 | ◀4 | ○ | ○ | ○ | ○ | ◀4 | ○ |
| | WITHDRAWAL UNIT·LOWER STACKER | ○ | ○ | ○ | ○ | ○ | ○ | ○ | ○ |
| | ↓ REJECT | ◀4 | ◀4 | ○ | ○ | ○ | ○ | ◀4 | ○ |
| | WITHDRAWAL UNIT·UPPER STACKER | ○ | ○ | ○ | ○ | ○ | ○ | ○ | ○ |
| | RECYCLE UNIT (AD-X) REJECT | ◀3 | ◀3 | × | × | ○ | ○ | ○ | ○ |
| | RECYCLE UNIT (AD-X) COLLECTOR | ○ | ○ | ◀5 | ◀5 | ○ | ○ | ○ | ○ |
| | RECYCLE UNIT (AD-X) THOUSAND YEN BILL | ○ | ○ | ○ | ○ | ○ | ○ | ○ | ○ |
| | RECYCLE UNIT (AD-X) TEN THOUSAND YEN BILL | ○ | ○ | ○ | ○ | ○ | ○ | ○ | ○ |
| | CARD TAKE-IN PART | | | | × | | | | |
| | RECEIPT | ○ | ○ | ○ | ○ | ○ | ○ | ○ | ○ |
| MEDIUM END | ↓ REJECT | ○ | ○ | ○ | ○ | ○ | ○ | ○ | ○ |
| | WITHDRAWAL UNIT·LOWER STACKER | ◀1 | ◀1 | ○ | ◀6 | ○ | ○ | ◀1 | ○ |
| | ↓ REJECT | ○ | ○ | ○ | ○ | ○ | ○ | ○ | ○ |
| | WITHDRAWAL UNIT·UPPER STACKER | ◀1 | ◀1 | ○ | ◀6 | ○ | ○ | ◀1 | ○ |
| | RECYCLE UNIT (AD-X) REJECT | ○ | ○ | ○ | ○ | ○ | ○ | ○ | ○ |
| | RECYCLE UNIT (AD-X) COLLECTOR | ○ | ○ | ○ | ○ | ○ | ○ | ○ | ○ |
| | RECYCLE UNIT (AD-X) THOUSAND YEN BILL | ◀1 | ◀1 | ○ | ◀6 | ○ | ○ | ◀1 | ○ |
| | RECYCLE UNIT (AD-X) TEN THOUSAND YEN BILL | ◀1 | ◀1 | ○ | ○ | ○ | ○ | ◀1 | ○ |
| | CARD TAKE-IN PART | ○ | ○ | ○ | ○ | ○ | ○ | ○ | ○ |
| | RECEIPT | | | | × | | | | |
| TRANSACTION KEY | DETAILED OPERATION | WITHDRAWAL | | DEPOSIT | | BALANCE | | | CASH PAYMENT |

TRANSACTION DEGRADATION PROCESSING METHOD FOR AUTOMATED TRANSACTION APPARATUS, SYSTEM FOR SAME, AND ADMINISTRATION SERVER FOR SAME

CROSS-REFERENCE TO RELATED APPLICATIONS

This application is based upon and claims the benefit of priority from the prior Japanese Patent Application No. 2004-067656, filed on Mar. 10, 2004, the entire contents of which are incorporated herein by reference.

BACKGROUND OF THE INVENTION

1. Field of the Invention

This invention relates to a transaction degradation processing method for automated transaction apparatus to perform transaction degradation processing for automated transaction apparatus which performs automated transactions according to customer operation, a system for same, and an administration server for same, and in particular relates to a transaction degradation processing method for automated transaction apparatus which makes decisions regarding degraded transactions in response to the state of the automated transaction apparatus, a system for same, and an administration server for same.

2. Description of the Related Art

Automated cash transaction apparatus and automated cash advance apparatus used by financial institutions and similar perform various transactions according to customer operation, such as cash deposits and payments, bankbook recording, transfer payments, and transfers between accounts. In recent years, as business locations have diversified and longer business hours have been adopted, modes of use of such automated transaction apparatus have increasingly included single-unit installation in unmanned shops, stations, and convenience stores.

Recent growth of the Internet and demands for automated transaction apparatus entailing lower costs have resulted in the provision of browsers in automated transaction apparatus, so that such automated transaction apparatus is being controlled via the World Wide Web (see for example Japanese Patent Laid-open No. 2000-298752).

On the other hand, such automated transaction apparatus has functions for handling cards, bankbooks and other input media, as well as different kinds of cash; and depending on the state of these mechanisms and the state of media and cash within the apparatus, states may occur in which specific transactions cannot be executed. In such cases, suspension of operation of the apparatus itself is not advisable, and it is necessary to identify and eliminate transactions for which, due to the above state, the apparatus cannot execute, and to continue apparatus operation to perform transactions which can be executed. This procedure is called transaction degradation.

For example, transaction degradation during certain hours and during weekdays or holidays may be performed for transactions which automated transaction apparatus is capable of executing, or transaction degradation may be performed as a consequence of the state of a unit installed in automated transaction apparatus (a cash unit, card unit, or similar), or due to the state of media.

Such transaction degradation processing is all controlled by a program incorporated within the automated transaction apparatus. When there is a "degradation" judgment by this program, transaction keys are erased and transactions are disabled by the program which displays the customer operation portion of the automated transaction apparatus.

Such conventional transaction degradation control is all performed by a program within the automated transaction apparatus, and so the program must be installed to all of the related automated transaction apparatus.

Further, transaction degradation conditions relating to hours of operation, weekdays and holidays are obtained from each bank host connected to the automated transaction apparatus, and so must be acquired from hosts for all of the automated transaction apparatus installations. Consequently communication costs are expected to be high.

Further, due to changes in the specifications of bank operations, the internal program must be modified for all automatic transaction apparatus installations in order to add transaction services and change degradation conditions, so that maintenance is difficult.

SUMMARY OF THE INVENTION

Hence an object of the invention is to provide a transaction degradation processing method for automated transaction apparatus which performs transaction degradation of automated transaction apparatus without installation of a program in the automated transaction apparatus, as well as a system and administration server to execute this method.

Another object of the invention is to provide a transaction degradation processing method for automated transaction apparatus to execute transaction degradation conditions for automated transaction apparatus so as to lower communication costs, as well as a system and administration server to execute this method.

Still another object of the invention is to provide a transaction degradation processing method for automated transaction apparatus to facilitate addition of transaction services and modification of degradation conditions, as well as a system and administration server to execute this method.

In order to attain these objectives, a transaction degradation processing method for automated transaction apparatus, which executes specified transactions according to customer operation among a plurality of transactions of this invention, has a step of transmitting the state of the automated transaction apparatus to an administration server which operates a plurality of automated transaction apparatus from the above automated transaction apparatus; a step of deciding the available transactions of the above automated transaction apparatus according to the state of the above automated transaction apparatus, referring to operation information stored in a database on the above administration server; and a step of transmitting the above decision results for available transactions to the above automated transaction apparatus.

An automated transaction system of this invention has automated transaction apparatus which executes specified transactions according to customer operation among a plurality of transactions, an administration server which operates a plurality of the above automated transaction apparatus, and a database which stores operation information for the above automated transaction apparatus; the administration server decides the available transactions of the above automated transaction apparatus according to states transmitted from the automated transaction apparatus, referencing operation information stored in the above database, and transmits the decision results for available transactions to the automated transaction apparatus.

An administration server of the invention has a database which stores operation information for automated transaction apparatus executing specified transactions according to customer operation among a plurality of transactions, and a server which operates a plurality of the above automated transaction apparatus; the above server decides the available transactions of the automated transaction apparatus from the states of the automated transaction apparatus transmitted from the automated transaction apparatus, referring to operating information stored in the above database, and transmits the decision results for available transactions to the automated transaction apparatus.

Further, in this invention it is preferable that the above transmission step comprises a step of transmitting the state of the above automated transaction apparatus when a customer issues an instruction to begin a transaction to the automated transaction apparatus.

Further, in this invention it is preferable that the above transmission step comprise a step of transmitting state information for the unit handling the media of the above automated transaction apparatus and state information for the above media, and that the above judgment step comprise a step of judging the available transactions of the automated transaction apparatus according to state information for the above unit and state information for the above media.

Further, in this invention it is preferable that the above decision step comprise a step of deciding, from state information for the above media, whether transactions using the above media can be executed.

Further, in this invention it is preferable that the above decision step comprise a step of deciding which transactions are available, referring to a table, stored in the above database, indicating available transactions according to state information for the above units and state information for the above media.

Further, in this invention it is preferable that the above decision step have a step of judging, from state information for the above media, whether operation using the above media is possible, and a step of deciding available transactions according to the judgment results, referring to a table indicating available transactions according to the above judgment results.

Further, in this invention it is preferable that the method further have a step of displaying available transactions on the transaction selection screen of the above automated transaction apparatus.

Further, in this invention it is preferable that the above transmission step has a step of transmitting information on the quantity of cash in the automated transaction apparatus and on the quantity of media for transaction recording in the automated transaction apparatus.

In this invention, by having a server with a database perform transaction degradation processing, there is no longer a need for installation of programs and tables in a number equal to the number of ATM units, modification of the table specifications is facilitated, and program maintainability is improved.

Also, through unified management using a database of the transaction service schedule of the financial institution host and of the unit state and media state of each ATM, a high level of maintainability, which is an advantage of database use, can be realized. And through adoption of a database, secondary utilization of data becomes possible, and retrieval and display of data by external systems is enabled.

BRIEF DESCRIPTION OF THE DRAWINGS

FIG. 5 is a drawing of the configuration of a center/store table of the automated transaction apparatus of FIG. 2;

FIG. 6 is a drawing of the configuration of the empty/full judgment condition table of the paper currency unit of the automated transaction apparatus of FIG. 2;

FIG. 7 is a drawing of the configuration of the empty/full judgment condition table of the coin unit of the automated transaction apparatus of FIG. 2;

FIG. 8 is a drawing of the configuration of a management table based on media full/empty of the automated transaction apparatus of FIG. 2;

FIG. 9 is a drawing of the configuration of the degradation table based on the unit state of the automated transaction apparatus of FIG. 2;

FIG. 18 is a drawing of the configuration of a center/store table of the automated transaction apparatus of FIG. 14;

FIG. 19 is a drawing of the configuration of an empty/full judgment condition table of an automated transaction apparatus unit of FIG. 14;

FIG. 20 is a drawing of the configuration of an operation table based on media full/empty of the automated transaction apparatus of FIG. 14;

DESCRIPTION OF THE PREFERRED EMBODIMENTS

Below, aspects of the invention are explained, in the order of automated transaction systems, a first aspect of degradation processing for automated transaction apparatus, a second aspect of degradation processing for automated transaction apparatus, and other aspects; however, this invention is not limited to these aspects.

Automated Transaction System

Figure 1:
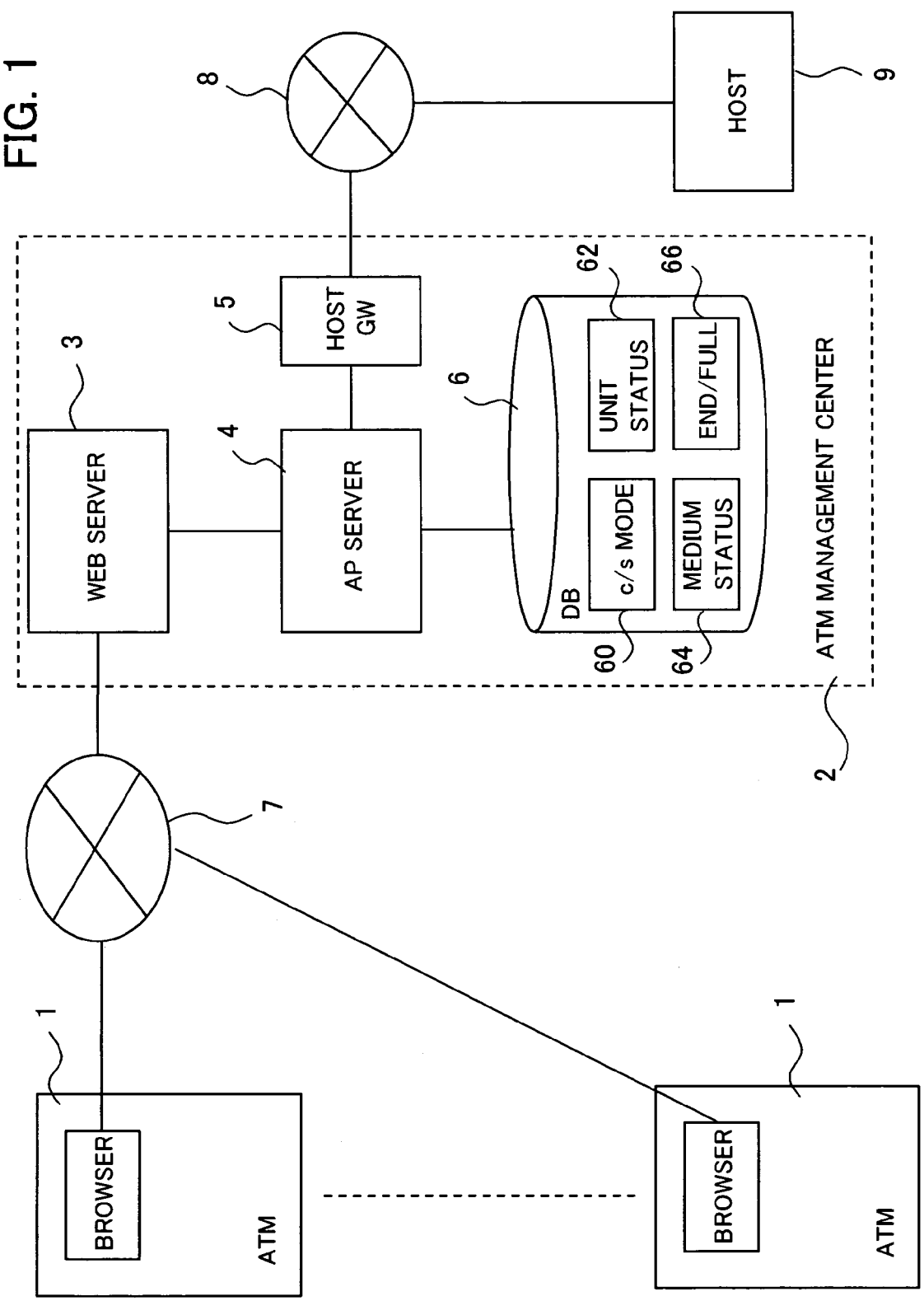
FIG. 1 is a drawing of the configuration of an automated transaction system of one aspect of the invention.

FIG. 1 is a drawing of the configuration of one aspect of an automated transaction system of the invention. As shown in FIG. 1, each automated cash transaction apparatus (called an "ATM") 1 has a transaction mechanism described below, a control unit which controls this mechanism, and a network communication unit (Web browser). Each ATM 1 is connected with an ATM operation center 2 through a network (for example, public line) 7.

The ATM operation center 2 controls operation of ATMs, is connected with a host computer 9 of a financial institution through the network 8, and also relays transaction data.

The operation center 2 has a Web server 3 connected to the network 7; an ATM business server 4 which exchanges transaction data with ATMs 1, controls and monitors operation of ATMs 1 and similar via the Web server 3; a database server 6 which stores various data used by the ATM business server 4; and a host gateway 5 which connects the ATM business server 4 and host computer 9.

The database 6 has a center/store mode table 60 which stores transaction operation modes at centers and stores for ATMs 1, a unit table 62 which stores degraded transactions according to unit states in ATMs 1, a media table 64 which stores degraded transactions according to media states, and an empty/full judgment condition table 66 which stores conditions used to make empty/full judgments according to state information from ATMs 1.

The business server 4 uses these tables 60, 62, 64, 66 according to state information from ATMs 1 to perform transaction degradation checks, as described below, and notifies the ATMs 1.

Thus by performing transaction degradation processing on the server side, there is no longer a need to install programs a number of times equal to the number of ATM installations, and program maintainability is improved through modification of specifications and similar. That is, the program to control the level of business which is normally incorporated in the ATMs 1 is moved to the server side, and converted into a Web application.

Further, through unified management on the database server 6 of the transaction service schedule of bank hosts and of unit states/media states for each ATM, the high level of maintainability which is an advantage of a database server 6 can be realized.

And, through adoption of a database, secondary utilization of data becomes possible, and retrieval and display of data by external systems is enabled.

First Aspect of Transaction Degradation Processing

Figure 2:
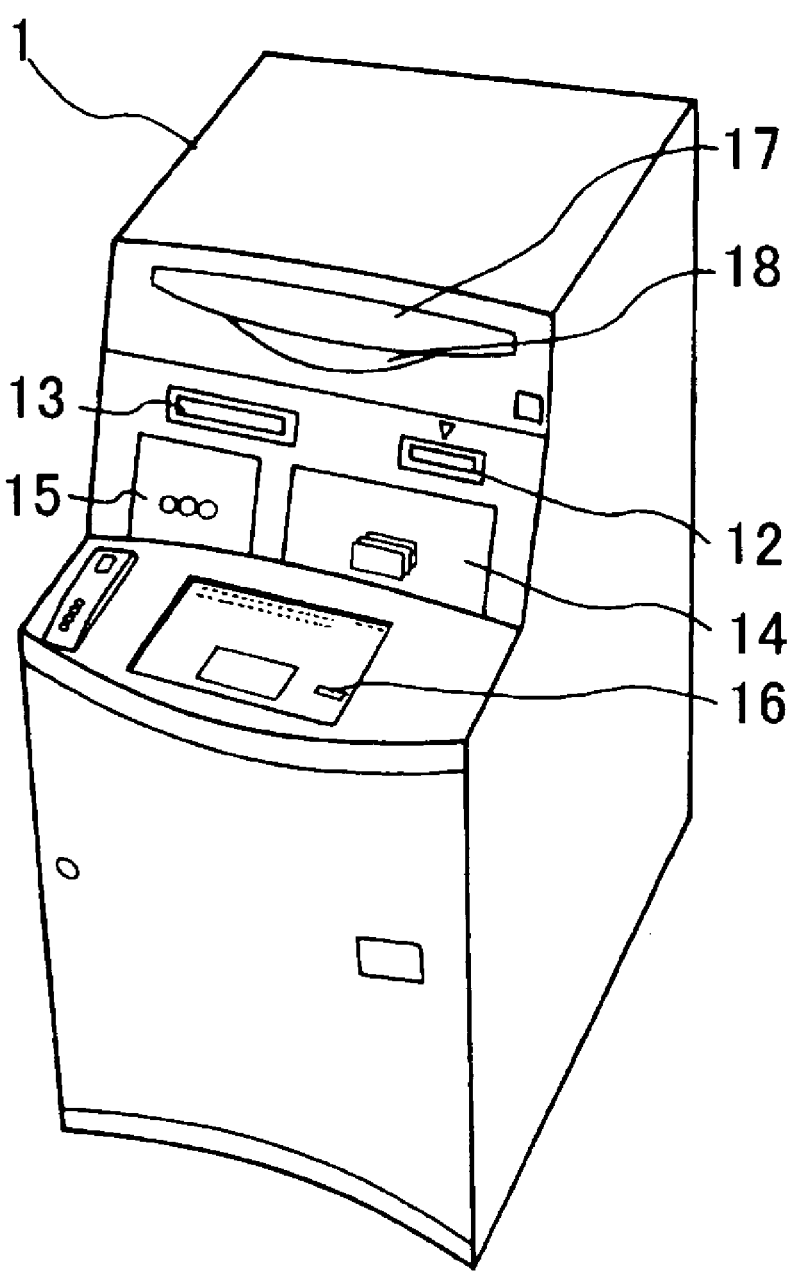
FIG. 2 is an external view of the first aspect of the automated transaction apparatus of FIG. 1.
Figure 3:
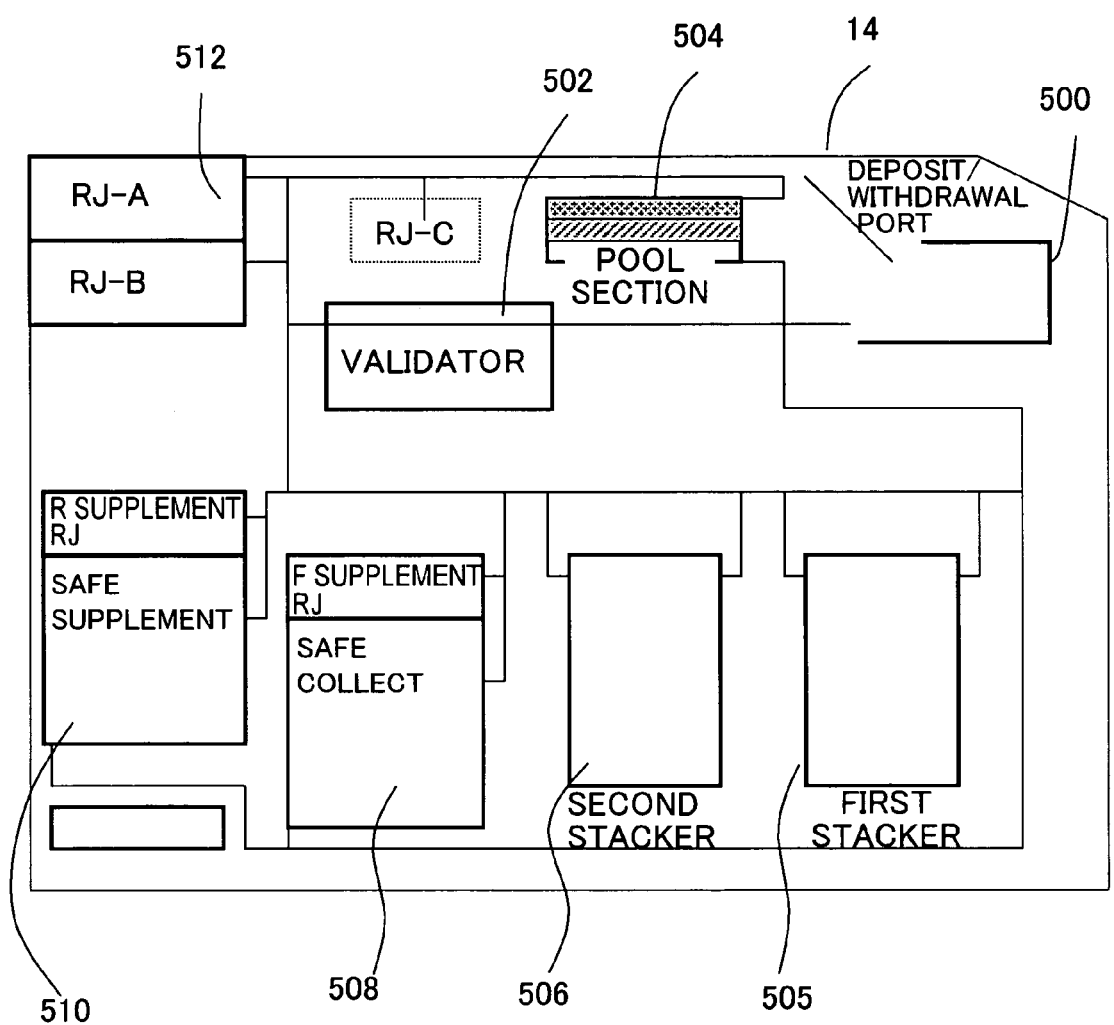
FIG. 3 is a drawing of the configuration of the recycling-type cash dispenser/receiver of the automated transaction apparatus of FIG. 2.
Figure 4:
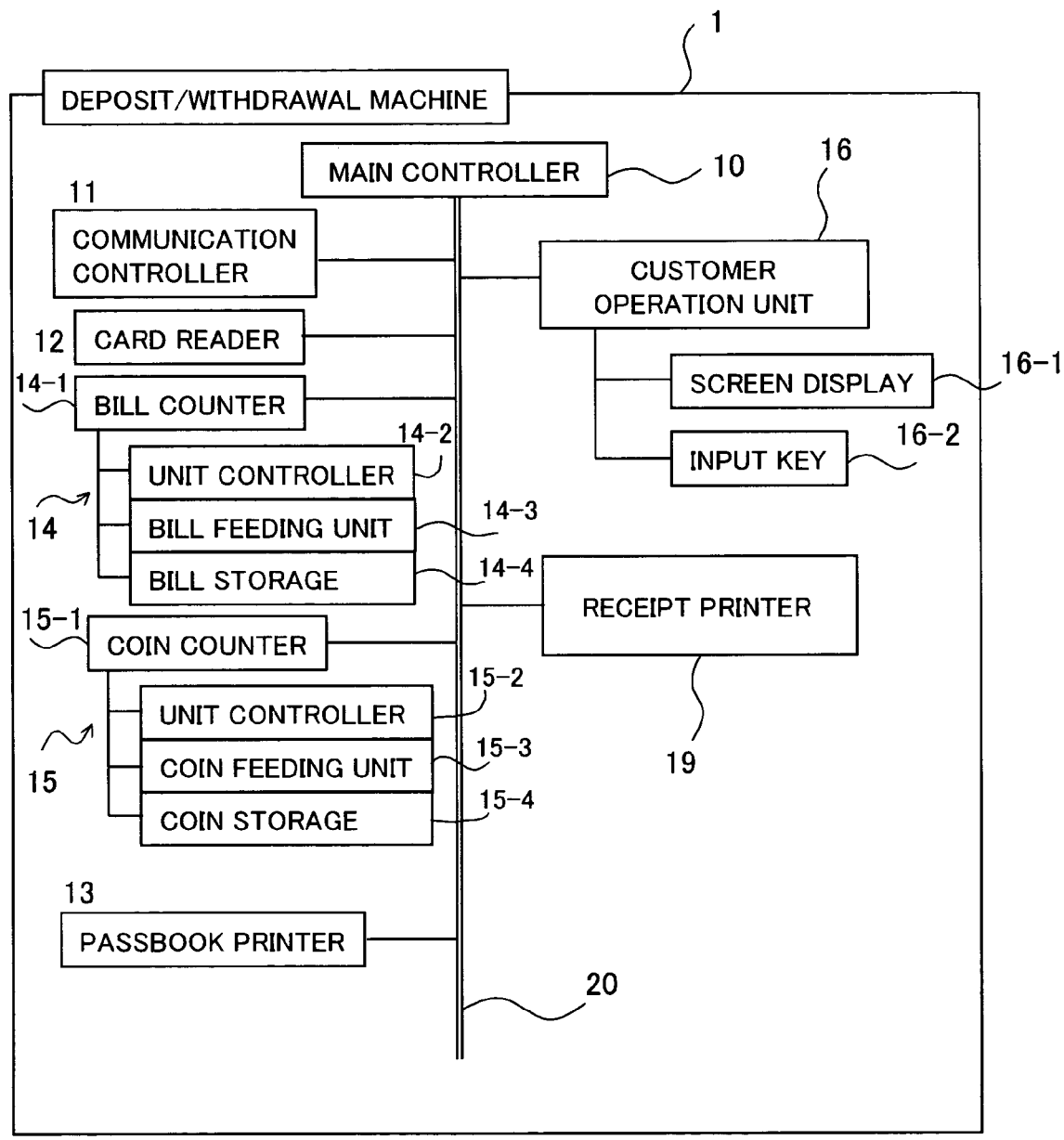
FIG. 4 is a block diagram of the automated transaction apparatus of FIG. 2.

FIG. 2 is an external view of the first aspect of the automated transaction apparatus 1 of FIG. 1, FIG. 3 is a drawing of the configuration of the paper currency recycling mechanism of the automated cash transaction apparatus 1 of FIG. 2, and FIG. 4 is a block diagram of the automated cash transaction apparatus of FIG. 2.

As shown in FIG. 2, the automated transaction apparatus 1 comprises a card insertion/ejection opening (card reader) 12 to insert and eject magnetic cards and to eject receipts; a bankbook insertion/ejection opening (bankbook printer) 13 for insertion and ejection of a magnetic bankbook; a paper currency insertion/ejection opening (paper currency recycling unit) 14 for insertion and ejection of paper currency; a coin insertion/ejection opening (coin unit) 15 for insertion and ejection of coins; UOP (User Operation Panel) 16 for operation by a user; operation display device 17 to display the state of operation to the user; and customer sensor 18 to detect a user.

As shown in the block diagram of automated transaction apparatus 1 in FIG. 4, the CRW (Card Reader-Writer) unit 12 uses a magnetic head to read a magnetic card inserted from the card insertion/ejection opening (card insertion opening) while transporting the card by a transport mechanism, not shown, and then returns the card to the insertion/ejection opening. An image sensor is also provided in the CRW unit 12, and the magnetic card (embossed portion) is optically read.

The RPR (Receipt Printer) unit 19 uses a printing head to print characters describing transaction results onto a receipt form, and ejects the printed receipt from the card insertion/ejection opening. Also, when an ejected receipt is not taken by the user within a prescribed amount of time, the RPR unit 19 retracts the receipt from the insertion/ejection opening and stores the receipt. Similarly, when an ejected magnetic card is not taken by the user within a prescribed amount of time, the magnetic card is retracted from the insertion/ejection opening and stored.

The UOP portion (customer operation portion) 16 comprises a display with touch panel (screen display portion and key input portion) 16-1, 16-2. The bankbook printing portion 13 prints a transaction record onto a bankbook inserted from the bankbook insertion/ejection opening, and ejects the bankbook from the bankbook insertion/ejection opening.

The recycling-type paper currency dispensation/deposition mechanism 14 has a paper currency quantity counting portion 14-1 which validates and counts paper currency inserted from the paper currency insertion/ejection opening; a paper currency storage portion (stacker) 14-4 to store paper currency; a paper currency transport portion 14-3 to transport paper currency between the paper currency insertion/ejection opening and paper currency storage portion 14-4; and a unit control portion 14-2 to perform deposit operations to store counted paper currency in the stacker 14-4, and to take off the required paper currency from the stacker 14-4 and discharge the paper currency to the paper currency insertion/ejection opening.

The recycling-type paper currency dispensation/deposition mechanism 14 is explained referring to FIG. 3. The recycling-type paper currency dispensation/deposition mechanism 14 has a deposit/withdrawal opening 500; validation portion 502; pool portion 504; paper currency stackers 505, 506; collection cashbox 508; replenishment cashbox 510; and reject box 512.

The unit control portion 14-2, upon receiving a paper currency accept/count command, opens the deposit/withdrawal opening 500. Then, when media (paper currency) is detected at the deposit/withdrawal opening 500, the deposit/withdrawal opening 500 is closed, validation (counting) is begun by the validation portion 502, and validated paper currency to the pool portion 504 is accumulated.

Next, when the unit control portion 14-2 receives a paper currency storage command, paper currency is stored in the paper currency stackers 505, 506 while counting the paper currency of the pool portion 504, and storage in the cashbox/stackers 505, 506 is completed. Also, upon receiving a paper currency deposit return command, the unit control portion 14-2 transports paper currency in the pool portion 504 to the deposit/withdrawal opening 500.

Further, upon receiving a paper currency dispense command, the unit control portion 14-2 dispenses paper currency from the stackers 505, 506, and transports the paper currency to the deposit/withdrawal opening 500, passing through the validation portion 502. And upon receiving a paper currency intake command, the unit control portion 14-2 transports paper currency in the deposit/withdrawal opening 500 to a specified location (for example, a location specified by a vendor-dependent parameter; in FIG. 3, the reject box 512).

Upon receiving a paper currency discharge command, the unit control portion 14-2 opens the deposit/withdrawal opening 500, and then, upon detecting the removal of paper currency, closes the deposit/withdrawal opening 500.

Returning to FIG. 4, the coin deposit/withdrawal mechanism 15 has a coin storage portion (stacker) 15-4 which stores coins; a coin counting portion 15-1 which validates and counts coins inserted from the coin insertion/ejection opening; a coin transport portion 15-3 which transports coins between the coin insertion/ejection opening and coin storage portion 15-4; and a unit control portion 15-2 which performs deposit operations to store counted coins in the coin storage portion 15-4, and dispenses required coins and discharges the coins to the coin insertion/ejection opening.

The communication control portion 11 performs communications with the Web server of the operation center 2 by using HTTP (Hyper Text Transfer Protocol). The main control portion 10 is connected to the units 11, 12, 13, 14, 15, 16 by a bus 20 to control these units.

FIG. 5 through FIG. 9 are drawings of the configurations of tables 60, 62, 64, 66 provided in the database 6 of FIG. 1. FIG. 5 is a drawing of the configuration of a center/store table 60. The leftmost column in FIG. 5 indicates the transaction operation (transaction) of the ATM 1; near the top, modes of operation are indicated.

As shown in FIG. 5, for the configuration of the ATM 1 described above, withdrawal operations include card withdrawal and card/bankbook withdrawal, whereas deposit operations include card deposit and bankbook deposit. There are also (bankbook) recording, balance inquiry, transfers between accounts, and transfer payments. Transfer payments include cash transfer payments without a transfer payment card, cash transfer payments using a transfer payment card, account transfer payment without a transfer payment card, and account transfer payment using a transfer payment card. Cashing is also possible; cashing, cashing inquiries, and cashing refunds can be performed.

On the other hand, the modes of operation at the top are dispense suspension, deposit suspension, recording suspension, payment transfer suspension, coin suspension, and account transfer suspension. In the figure, circles indicate that the transaction is possible, and marks 'X' indicate that the transaction is not possible. For example, in dispense suspension mode, card withdrawal, card/bankbook withdrawal, cash transfer payments without a transfer payment card, cash transfer payments using a transfer payment card, and cashing (cash advances) cannot be performed.

The deposit-related operations of card deposits and bankbook deposits, as well as (bankbook) recording, balance inquiries, transfers between accounts, account payment transfers without a transfer payment card, account payment transfers using a transfer payment card, cashing inquiries, and cashing refunds can be handled.

This center/store table 60 is decided on by the financial institution host 9 based on the store and time period, and is loaded by the host 9 into the database 6. Then, one among the six operation modes is selected according to the store and schedule, that is, according to the time period (from 9:00 to 16:00, from 16:00 on, and similar).

Next, the full/empty judgment condition table 66, used for media full/empty judgments of ATMs 1, is explained using FIG. 6 and FIG. 7. FIG. 6 is a paper currency full/empty judgment condition table 66-1. As explained below, an ATM 1 sends notification of values (quantity stored, quantity rejected) of a cash counter for media (paper currency, coins).

FIG. 6 is a table of judgment results (notification contents) and media states; when a stacker or cashbox sensor detects a full state, or when a cash counter value exceeds the quantity equivalent to a full state, a full state is judged to have occurred. Apart from this full state, there are second-degree near-full and first-degree near-full states indicating states close to the full state; the state is judged to be second-degree near-full when the quantity is (full quantity minus deposit limit quantity or greater), and first-degree near-full when the quantity is (full quantity—400).

The full quantity and the deposit limit quantity are set according to the apparatus operating state (for example, the installation location and time period); in this example, the full quantity is set to 10,000 bills, and the deposit limit quantity is set to 200 bills.

Similarly, when either the sensor in a stacker or cashbox detects the empty state or the cash counter value is zero, an empty state is judged to have occurred. Apart from this empty state, there are a second-degree near-end state and a first-degree near-end state indicating states close to the empty states; the state is judged to be the second-degree near-end state at or below the withdrawal quantity limit, and to be the first-degree near-end state at or below the quantity for near end notification.

These near-end quantities and the withdrawal quantity limit are set according to the operating state of the apparatus (for example, the location of installation and time period); in this example, near-end quantities are two hundred 10,000-yen bills and twenty 1000-yen bills, and withdrawal quantity limits are set to thirty 10,000-yen bills and to eight 1000-yen bills. Otherwise, the state is judged to be normal.

Similarly, FIG. 7 shows a coin full/empty judgment condition table 66-2; when either the coin storage portion sensor detects a full state or the cash counter value is equal to or exceeds the full quantity, a full state is judged to have occurred. And, when either a coin storage portion sensor detects an empty state or the cash counter value is zero, an empty state is judged to have occurred. Apart from this empty state, there is a first-degree near-end state indicating a state close to empty; the state is judged to be the first-degree near-end state at or below the quantity for near end notification.

The full quantity and near-end notification quantity are set according to the state of operation of the apparatus (for example, the location of installation and time period); in this example, the full quantity is 1200, and the near-end notification quantity is set to 20. Otherwise, the state is judged to be normal.

Degraded transactions are decided according to such judgment results using the operation contents and media empty/full degradation conditions table 64 shown in FIG. 8. In the table 64 of FIG. 8, operation contents appear in the leftmost column, and media full/end states for each unit (receipt, transfer payment card, paper currency, coin, bankbook intake portion, and reject portion) appear at the top; transactions which cannot be handled are indicated by an mark 'X', and transactions which can be handled are indicated by a circle.

Similarly to FIG. 5, FIG. 8 shows, as transactions handled by an ATM 1 of the above-described configuration, withdrawal operations including card withdrawal and card/bankbook withdrawal, and deposit operations including card deposit and bankbook deposit, as well as (bankbook) recording, balance inquiry, transfers between accounts, cash transfer payments without a transfer payment card, cash transfer payments using a transfer payment card, account transfer payment without a transfer payment card, account transfer payment using a transfer payment card, cashing, cashing inquiries, and cashing refunds can be performed.

On the other hand, the modes of operation at the top include, as media-end modes, receipt form end, transfer payment card end, second-degree end of 10,000-yen bills, second-degree end of 1000-yen bills, and first-degree end of coins. Media-full modes include bankbook intake portion full, stored paper currency near-full, stored coins near-full, paper currency reject box near-full, and coin reject box near-full.

For example, when receipt media is ended, and receipts cannot be issued, it is decided that operations other than bankbook recording cannot be handled. Also, in the case of a card withdrawal, the transaction cannot be handled when 10,000-yen bills are in the second-degree near-end mode, but when only 1000-yen bills are in the second-degree near-end mode, withdrawal of 10,000-yen bills can be performed instead; this is indicated by a triangle symbol in the figure.

Similarly, with stored paper currency in the near-full state, it is decided that card deposits, bankbook deposits, cash transfer payments, and cashing refunds, in which cash deposits are performed, cannot be handled; whereas other transactions involving withdrawals can be handled.

Next, a unit table 62 used to decide on transaction degradation according to unit states is explained, referring to FIG. 9. In this example, unit conditions for degradation of all transactions and for recording transaction degradation are described.

Conditions for degradation of all transactions are the journal printer unit being unconnected, impairment or failure, and setup failure, in conjunction with cases in which the electronic journal (journal memory) cannot be used, and cases of a hard disk state error. Further conditions are cases in which either the paper currency unit, or the card unit, or the receipt unit, is unconnected, undergoes impairment or failure, undergoes setup failure, or has an internal reservation or logically detected residual of the medium.

Similarly, recording transaction degradation occurs in cases in which the recording unit is unconnected, impairment occurs, there is a setup failure, or there is internal reservation or logically detected residual of the medium.

Figure 10:
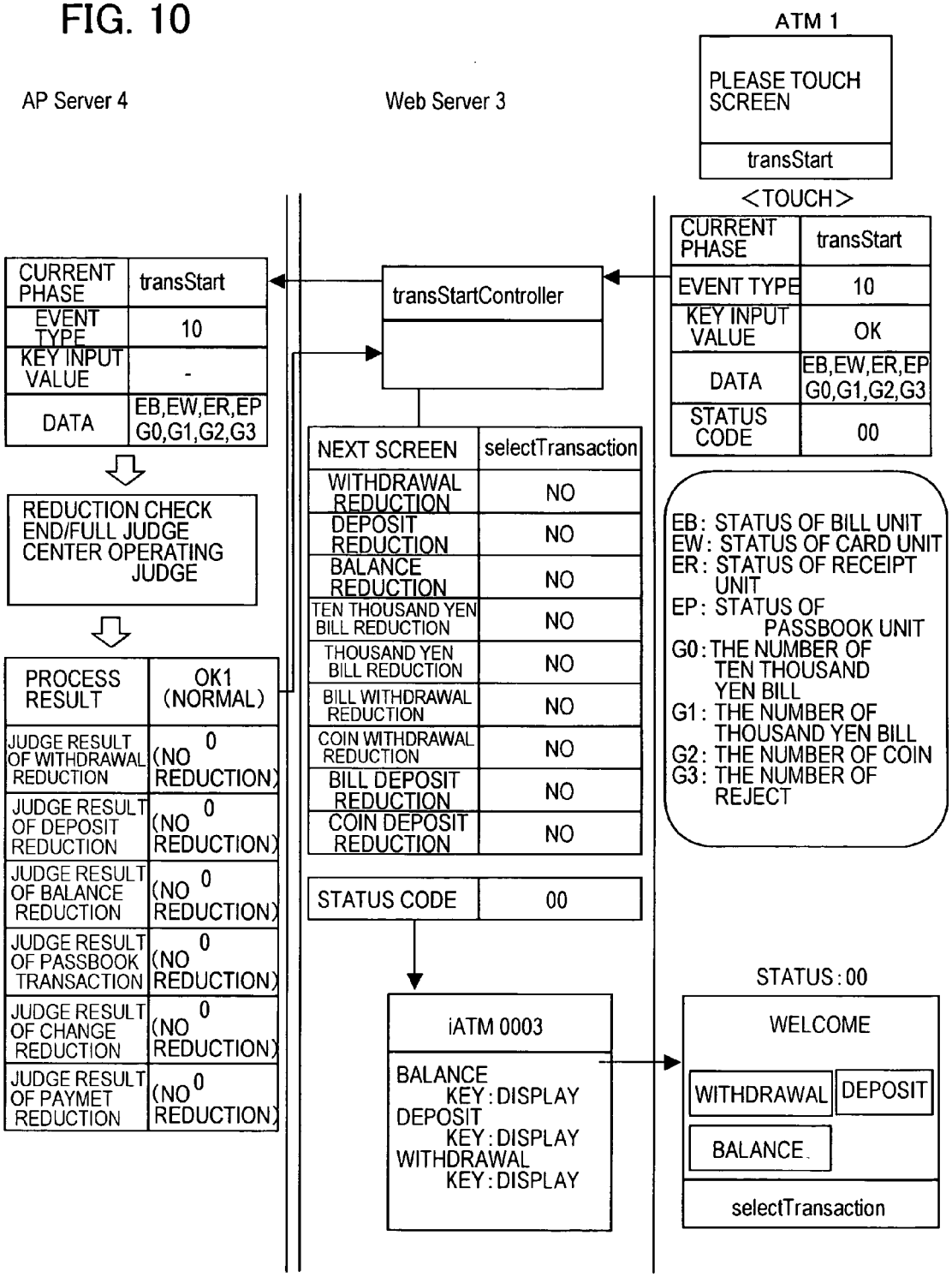
FIG. 10 is a sequence diagram of transaction degradation processing at the time of transaction initiation in the automated transaction apparatus of FIG. 2.
Figure 11:
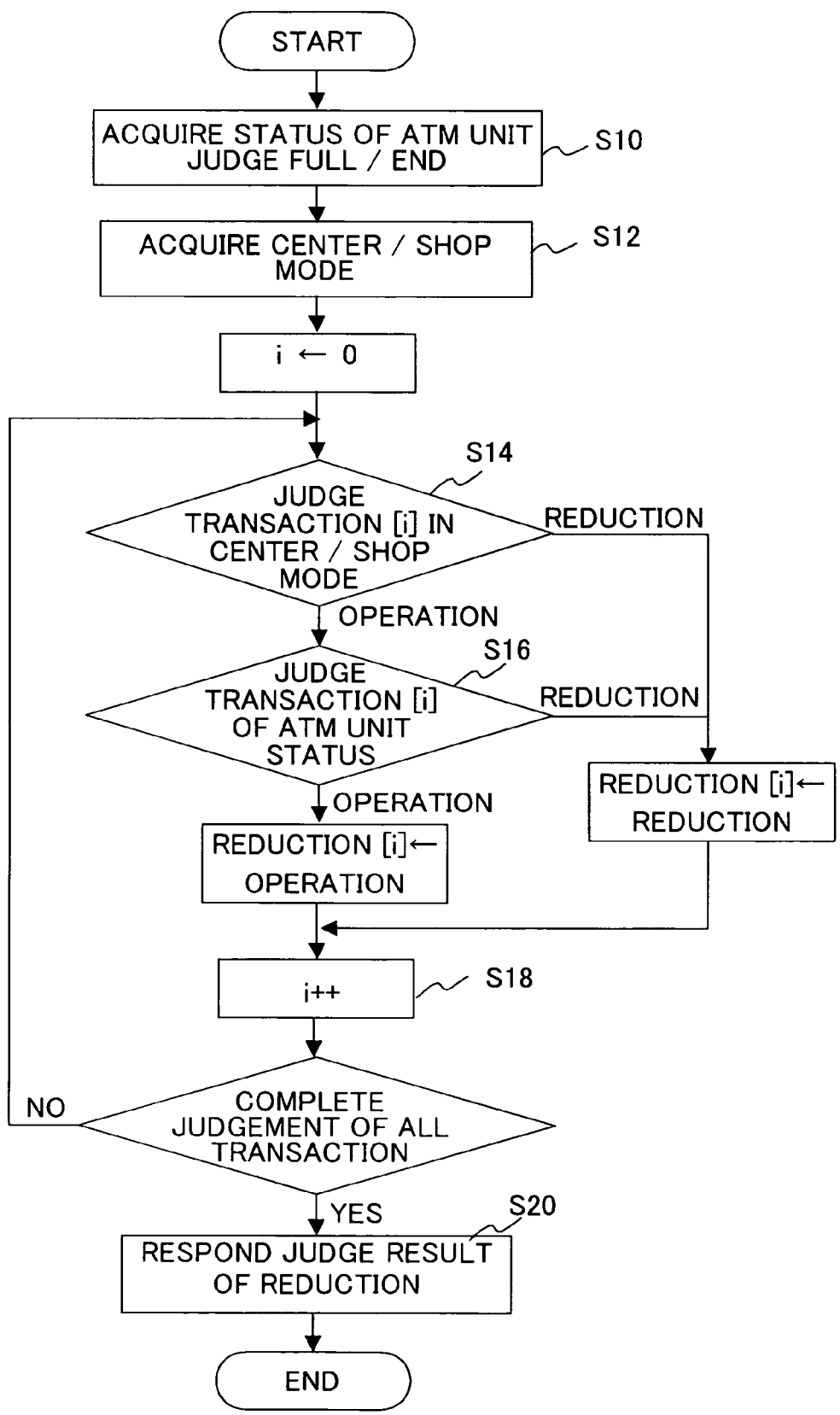
FIG. 11 is a flow diagram of transaction degradation processing in one aspect of the invention.
Figure 12:
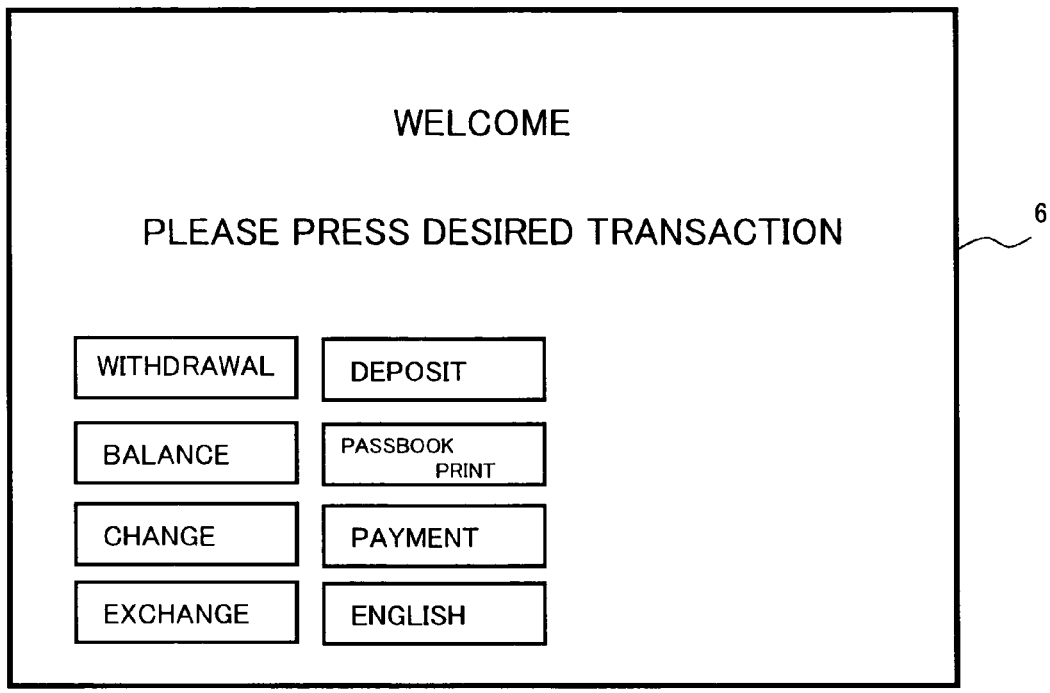
FIG. 12 is an explanatory diagram of the selection screen for all transactions of the automated transaction apparatus of FIG. 2.
Figure 13:
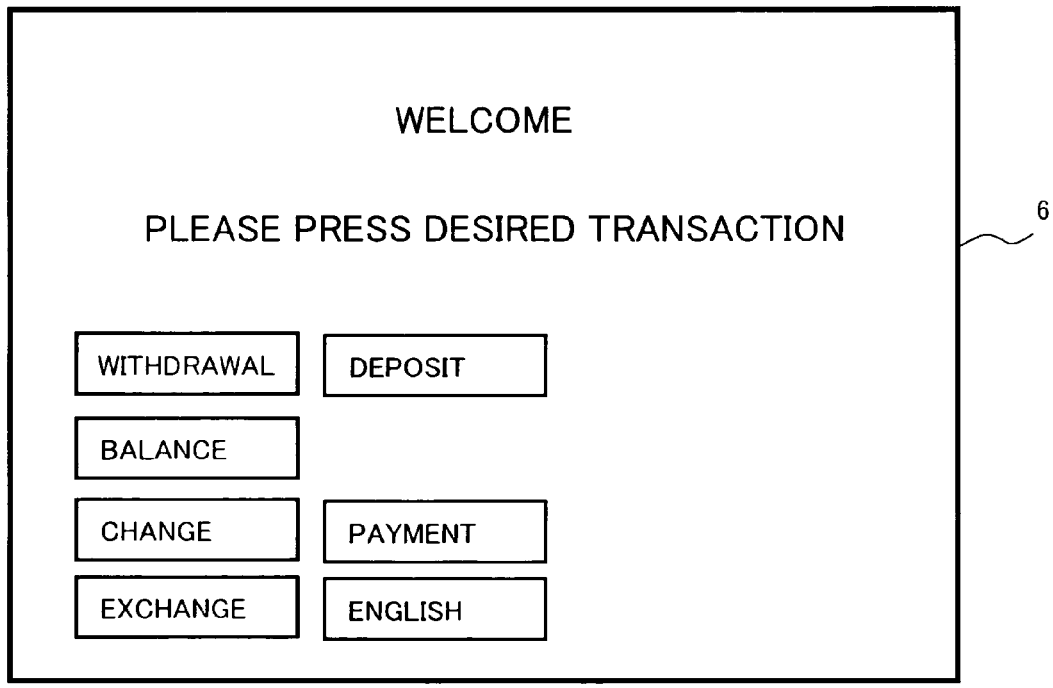
FIG. 13 is an explanatory diagram of the selection screen during transaction degradation of the automated transaction apparatus of FIG. 2.

Next, transaction degradation processing of the business server 4 of the automated transaction system is explained, using FIG. 10 through FIG. 13. FIG. 10 is a sequence diagram of transaction degradation processing at the time of transaction initiation, FIG. 11 is a sequence diagram of the transaction degradation processing of FIG. 10, and FIG. 12 and FIG. 13 are explanatory diagrams of transaction degradation processing.

As shown in FIG. 10, at a wait screen displaying "Please touch the screen" on the UOP 16 of the ATM 1, when the customer touches the UOP 16, the transaction begins. First the ATM 1 notifies the Web server 3 of the client ID, event type, current phase (transaction initiation), data (apparatus state and media quantities), and similar.

In ATMs 1 with the configuration of FIG. 2 through FIG. 4, apparatus states include state information (sensor information, residual information and similar) EB for paper currency/coin devices 14, 15, state information EW for the card device 12, state information ER for the receipt device 19 and similar, state information EP for the bankbook device 13, and similar. Media information includes the quantities of 10,000-yen bills, 1000-yen bills, and coins G0 to G3 for the stackers and reject box.

The Web server 3 receives this information, starts the transaction start controller (program), and notifies the business server 4 of the current phase, event type, and data (apparatus states EB, EW, ER, EP, media information G0 to G3).

As indicated in FIG. 11, the business server 4 references the tables 60, 62, 64, 66 of the database 6, performs transaction degradation checks, judges whether degradation has occurred for each transaction, and returns the degradation judgment results for each transaction to the Web server 3.

In the Web server 3, the transaction controller receives this information and creates the data for the next screen. Because the next screen is a transaction selection screen, a decision is made as to whether degradation has occurred for each transaction (withdrawals, deposits, balance inquiries, recording, and similar), a screen view for displaying keys of the next screen is created, and this is transmitted to the ATM 1 in HTTL (Hyper Text Transfer Language).

At the ATM 1, this is viewed by a browser, and the transaction keys specified for display are displayed on the screen of the UOP 16.

FIG. 11 is used to explain the above-described transaction degradation processing, referring to the tables of FIG. 5 through FIG. 9.

(S10) First, unit states (including media states) of the ATM 1 are acquired, and empty/full judgments are made, referring to the end/full condition tables 66-1 and 66-2 in FIG. 6 and FIG. 7. That is, information on the quantities of 10,000-yen bills and 1000-yen bills is used to reference the end/full judgment condition table 66-1 of FIG. 6 in order to judge whether the state of 10,000-yen bills is a near-end state, whether the state of 1000-yen bills is a near-end state, whether paper currency storage is full, whether the state of coins is a near-end state, and whether the stored coin state is full. Similarly, the quantities of paper currency and coins in the reject box are used to judge whether reject quantities are full or not.

(S12) Next, mode information for the center/store table 60 of FIG. 5 is acquired, and the transaction pointer i for transaction services in FIG. 5 is initialized to "0".

(S14) For each transaction (i), the operation mode table 60 of FIG. 5 is used to reference the column for one operation mode, specified by the store and schedule determined from the client ID, to judge whether the transaction (i) is set to suspended. If set to suspended, degradation is judged to have occurred, and degradation is set to the degradation pointer (i).

(S16) If the transaction (i) is being executed, the ATM unit state of transaction (i) is judged. First, unit state information from the above-described ATM 1 is used to reference the unit degradation condition table 62 (FIG. 9), to judge whether transaction degradation is applicable. If transaction degradation is applicable, then degradation is judged to have occurred, and the degradation pointer (i) is set to degradation. If transaction degradation is not applicable, then it is judged whether degradation is applicable to the transaction (i) based on the above-described full/end judgement result according to the media empty/full degradation condition table 64 (FIG. 8). If transaction degradation is applicable, then degradation is judged to have occurred, and the degradation pointer (i) is set to degradation. Again, if transaction degradation is not applicable, the degradation pointer (i) is set to operation.

(S18) The transaction pointer (i) is incremented by one, and a judgment is performed, based on the value of the pointer (i), to determine whether judgments have been completed for all transactions in FIG. 5 and FIG. 8. If judgments have been completed for all transactions, processing returns to step S14.

(S20) If judgments have been completed for all transactions, the judgment results shown in FIG. 10 are obtained. Degradation judgment results for each transaction are returned to the Web server 3, and at the Web server 3, the transaction controller receives these results and creates the data for the next screen. That is, because the next screen is a transaction selection screen, the occurrence of degradation is decided for each transaction (withdrawal, deposits, balance inquiries, recording, and similar), a screen view to display keys on the next screen is created, and this is transmitted in HTTL (Hyper Text Transfer Language) to the ATM 1. Degradation processing is then completed.

FIG. 12 is the transaction selection screen for all available transactions. When, as a result of the degradation check performed upon initiation of a transaction, bankbook recording is a degraded transaction, the key for bankbook recording is erased, as shown in FIG. 13.

In this way, by performing transaction degradation processing on a server having a database, there is no longer a need for installation of programs and tables in a number equal to the number of ATM units, modification of the table specifications is facilitated, and program maintainability is improved.

And, through unified management on a database server 6 of the bank host transaction service schedule and unit states/media states for each ATM, the high level of maintainability which is an advantage of a database server 6 can be realized. Moreover, through adoption of a database secondary utilization of data becomes possible, and retrieval and display of data by external systems is enabled.

Further, transaction degradation judgments are performed each time the screen is touched by a customer, that is, upon each initiation of a transaction; hence transaction degradation judgments can be performed under the most recent conditions, and transaction degradation judgments are not performed when no customers are present, so that excess judgment processing can be prevented.

Second Aspect of Transaction Degradation Processing

Figure 14:
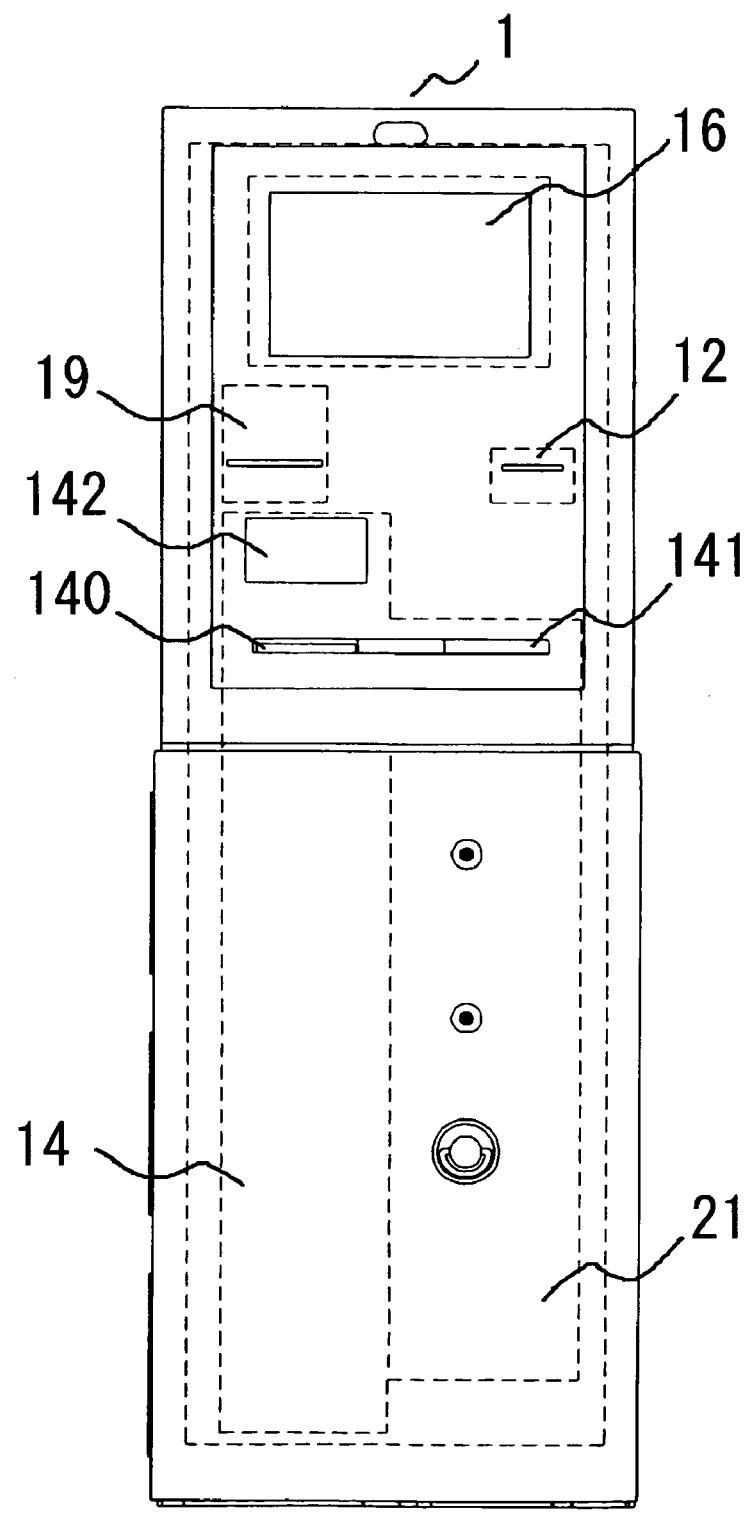
FIG. 14 is an external view of a second aspect of the automated transaction apparatus of FIG. 1.
Figure 15:
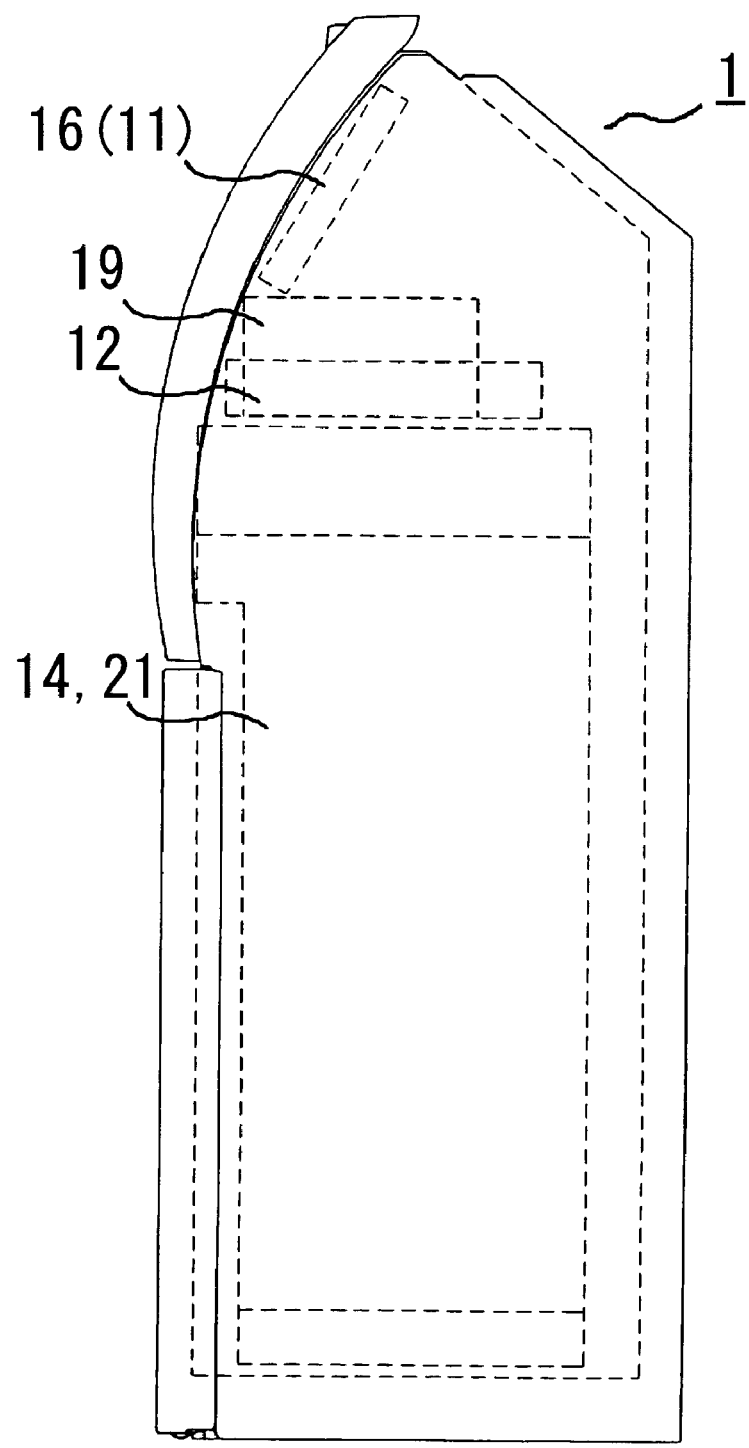
FIG. 15 is a lateral view of the automated transaction apparatus of FIG. 14.
Figure 16:
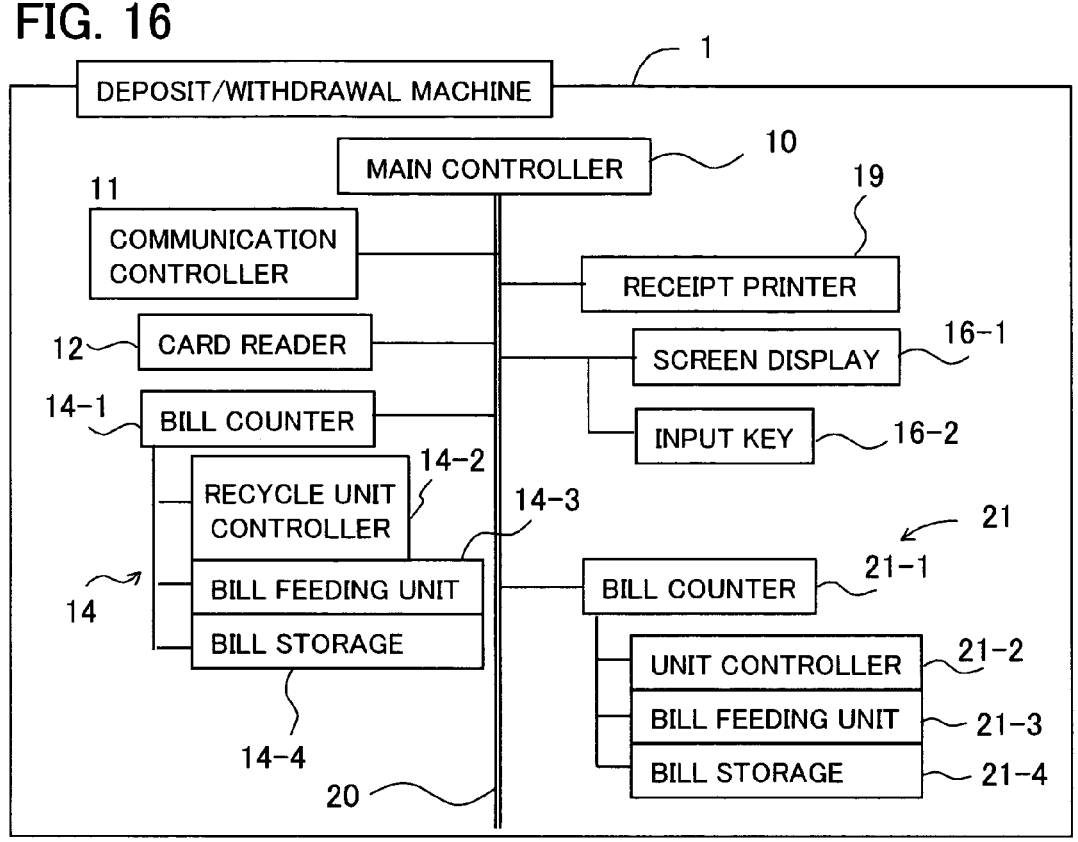
FIG. 16 is a block diagram of the automated transaction apparatus of FIG. 14.
Figure 17:
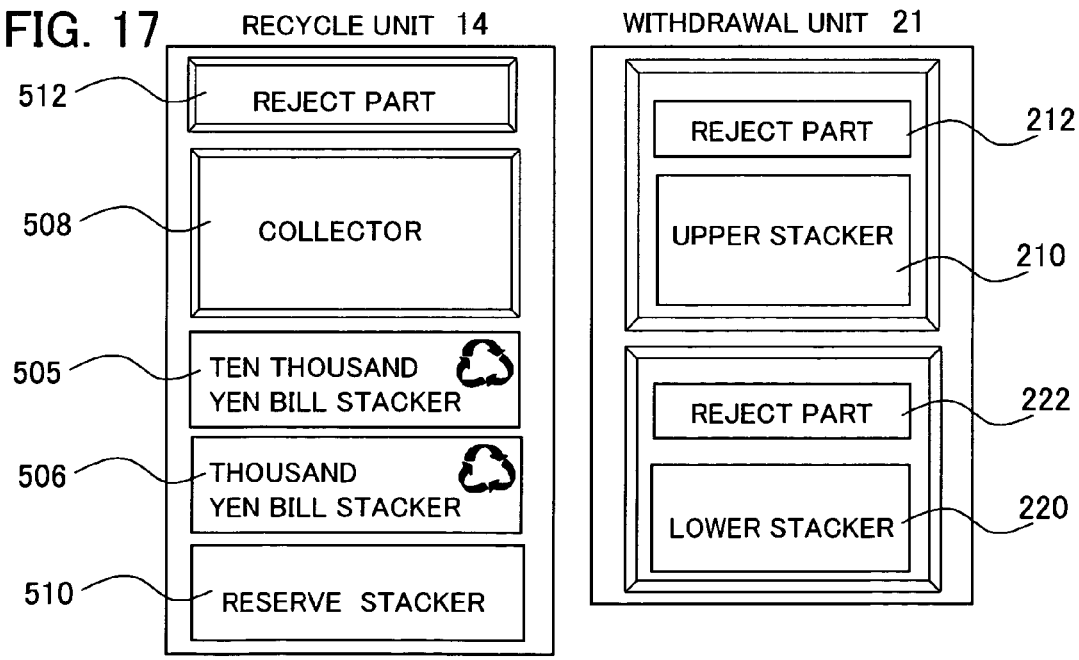
FIG. 17 is a drawing of the configuration of the cash unit of the automated transaction apparatus of FIG. 14.

FIG. 14 is an external view of another aspect of the automated transaction apparatus of FIG. 1; FIG. 15 is a lateral view of the automated transaction apparatus of FIG. 14; FIG. 16 is a block diagram of the automated transaction apparatus of FIG. 14; and FIG. 17 is a lateral view of the cash units of FIG. 14.

As shown in FIG. 14 and FIG. 15, in the automated transaction apparatus 1, a card reader 12 having a card insertion/ejection opening for insertion and ejection of magnetic cards and a receipt printer 19 having a receipt ejection opening for ejection of receipts are positioned below the UOP (customer operation portion) 16; below this are positioned a paper currency insertion/ejection device 14 having a paper currency insertion opening 142 for insertion of paper currency and a second withdrawal opening 140 for ejection of paper currency being withdrawn, as well as a paper currency withdrawal device 21 having a first withdrawal opening 141.

That is, this automated transaction apparatus 1 is a simplified ATM which handles only paper currency and does not handle bankbooks, and is suitable for installation in a convenience store or supermarket.

FIG. 16 is a block diagram of the automated transaction apparatus of FIG. 14 and FIG. 15. As shown in FIG. 16, the card reader portion (card reader-writer) 12 uses a magnetic head to read a magnetic card inserted from the card insertion/ejection opening (card insertion opening) while transporting the card using a transport mechanism, not shown, and returns the card to the insertion/ejection opening.

An image sensor is provided in the card reader portion 12, to optically read the magnetic card (embossed portion). The UOP portion (customer operation portion) 16 comprises a display with a touch panel (screen display portion and key input portion) 16-1, 16-2. The receipt printer (RPR) 19 prints a transaction record onto a receipt form and ejects the receipt from the receipt ejection opening.

The cash units comprise a recycling-type paper currency dispenser/receiver 14 and paper currency withdrawal device 21. The recycling-type paper currency dispenser/receiver 14 has a paper currency counting portion 14-1 which validates and counts paper currency inserted from the paper currency insertion opening 142; a paper currency storage portion (stacker) 14-4 which stores paper currency; a paper currency transport portion 14-3 which transports paper currency between the paper currency insertion opening 142, ejection opening 140, and paper currency storage portion 14-4; and a recycling unit control portion 14-2 which performs deposit operations to store counted paper currency in the stacker 14-4, as well as withdrawal operations to dispense required paper currency from the stacker 14-4 and discharge the paper currency to the paper currency ejection opening 140.

As shown in FIG. 17, this recycling-type paper currency dispenser/receiver 14 has, as the paper currency storage portion 14-4, a 10,000-yen bill stacker 505, 1000-yen bill stacker 506, collection cashbox 508, reject portion 512, and temporary reservation stacker (auxiliary stacker) 510, and is configured similarly to the recycling-type paper currency dispenser/receiver shown in FIG. 3.

The paper currency withdrawal device 21 has a paper currency storage portion (stacker) 21-4 which stores paper currency, a paper currency counting portion 21-1 which validates and counts paper currency picked up from the paper currency storage portion 21-4, paper currency transport portion 21-3 which transports paper currency between the paper currency withdrawal opening 141 and paper currency storage portion 21-4, and unit control portion 21-2 which performs withdrawal operations to dispense the required paper currency and release the paper currency to the paper currency withdrawal opening 141.

As shown in FIG. 17, this paper currency withdrawal device 21 has, as a paper currency storage portion 21-4, an upper (10,000-yen bill) stacker 210 having a reject portion 212, and a lower (1000-yen bill) stacker 220 having a reject portion 222.

The main control portion (CPU) 10 is connected via the bus 20 to the receipt printer 19, card reader portion 12, paper currency counting portions 14-1 and 21-1, customer operation portions 16-1 and 16-2, and communication control portion 11, and controls ATM transactions. The communication control portion 11 communicates with the Web server 3 of the operation center 2 using HTTL (Hyper Text Transfer Language).

FIG. 18 through FIG. 20 are drawings of the configuration of tables 60, 64, 66 provided in the database 6 of FIG. 1 for use in degradation processing for the ATM 1.

FIG. 18 shows the configuration of a center/store table 60 for the ATM 1. The left-hand columns in FIG. 18 indicate transaction keys and transaction services (transactions) of the ATM 1; at the top are operation modes.

As shown in FIG. 18, in an ATM 1 of the configuration described above, withdrawal services include card withdrawals and cashing, whereas deposit services include card deposits and cashing refunds. Balance inquiries include balance inquiries using a card, cashing inquiries, and continuous card withdrawal in which card withdrawal is performed after a balance inquiry. Transfer payments are limited to account payments.

On the other hand, the operation modes shown at the top in the figure include, as deposit modes, card deposit suspension and credit refund suspension; as withdrawal modes, card withdrawal suspension, credit borrowing suspension, payment after inquiry suspension; and as balance inquiry modes, balance inquiry suspension and credit inquiry suspension. Moreover, account transfer payment suspension is also provided. In the figure, circle indicate transactions are possible, and symbol 'X' indicate transactions are not possible.

For example, in the card withdrawal suspension mode, card withdrawals, cashing, and continuous card withdrawal cannot be handled. Deposit services such as card deposits and cashing refunds, as well as card balance inquiries, cashing refunds, and account transfer payments can be handled.

This center/store table 60 is determined by the financial institution host 9 according to the store and the time period, and is loaded into the database from the host 9. One of the eight operation modes is then selected according to the store and the schedule, that is, the time period (from 9:00 to 16:00, from 16:00 on, and similar).

Next, the full/end judgment condition table 66, used in media full/end judgments for an ATM 1, is explained using FIG. 19. FIG. 19 is a paper currency full/end judgment condition table 66. As explained below, the ATM 1 issues notification of the values (numbers stored, reject numbers) of cash counters for media (paper currency, coins).

FIG. 19 is a table of judgment conditions (end/full) and units (media); when, in a receipt, an empty sensor detects an empty state, the empty state is judged to occur. There is no full state. In the card intake portion, there is no empty state; when 20 or more cards are taken in, the full state is judged to occur.

In the 10,000-yen bill stacker 505 of the recycling portion, when there are 21 or fewer bills or when the empty sensor detects an empty state, the empty state is judged to occur, and when there are 200 or more bills or when the full sensor detects a full state, the full state is judged to occur. In the 1000-yen bill stacker 506 of the recycling portion, when there are 9 or fewer bills or when the empty sensor detects an empty state, the empty state is judged to occur, and when there are 500 or more bills or when the full sensor detects a full state, the full state is judged to occur.

In the collection cashbox 508 of the recycling portion, with zero bills the empty state is judged to occur, and with 2000 or more bills or when the full sensor detects a full state, the full state is judged to occur. In the reject box 512 of the recycling portion, with zero bills the empty state is judged to occur, and with 100 or more bills or when the full sensor detects a full state, the full state is judged to occur.

Next, in the paper currency withdrawal portion 21, when the number of 10,000-yen bills in the upper or lower stacker 210 is 21 or fewer, the empty state is judged to occur, and when the number is 1500 or greater, the full state is judged to occur. When the number of 1000-yen bills in the lower or upper stacker 220 is 9 or fewer, the empty state is judged to occur, and when the number is 1500 or greater, the full state is judged to occur.

In the upper and lower reject portions 212, 222, with zero bills the empty state is judged to occur, and with 20 or more bills the full state is judged to occur. The number of bills for the empty and full states are set according to the operation state of the apparatus (for example, the installation location and the time period).

Degraded transactions are decided according to these full/end judgment results using the service contents and media end/full degradation condition table 64 shown in FIG. 20. In the table 64 in FIG. 20, media full/end states (receipts, card intake portion, 10,000- and 1000-yen bills of the recycling portion, collection box, rejection portion, upper stacker of withdrawal portion, reject portion, lower stacker, reject portion) at the top. And transactions which cannot be handled indicate by symbol 'X' and transaction which can be performed indicate by circle, together with transactions for which conditions are imposed (solid triangles ▲).

Further, as the transactions services of an ATM 1 with the configuration described above, similarly to FIG. 18, withdrawal services include card withdrawals and cashing; deposit services include card deposits and cashing refunds; balance inquiries include balance inquiries using a card, cashing inquiries, and card withdrawals after balance inquiries; and in addition there are account transfer payments.

For example, when the receipt media is in the empty state, receipts can no longer be issued, and so all transaction services are determined to be impossible. And, when 1000-yen bills in the recycling portion are in the empty state, in cases of card withdrawals, cashing and continuous card withdrawals, if neither the recycling portion nor the withdrawal portion is in a 10,000-yen-bill-empty state, transactions are possible, whereas if either is in a 10,000-yen-bill empty state then withdrawal transactions are degraded, and with 1000-yen bills in the empty state, 1000-yen-bill withdrawal degradation occurs (▲1).

The cases of the empty states of the upper stacker and lower stacker of the withdrawal portion are similar. Also, cashing refunds are similar to card-based transactions when there are 11 or more 1000-yen bills in either case.

Similarly in the case of the full state of the card take in portion, all transaction services are judged to be not available. When the reject portion is in the full state, in cases of card withdrawals, cashing, and continuous card withdrawals, if 10,000-yen bill operations are not possible using stacker other than the stacker in question, withdrawal degradation is judged to occur, and similarly when 1000-yen bill operations are not possible, 1000-yen withdrawal degradation is judged to occur ("▲4").

In the case of a media-full state in the reject portion of the recycling portion, deposit transactions are taken to be not possible, whereas if the withdrawal portion can be used, execution of withdrawals is judged to be possible ("▲3"). When the collection box of the recycling portion is in the media-full state, it is decided that deposits cannot be handled.

The unit table 62 used to determine transaction degradation according to unit states is the same as in FIG. 9, but there is no recording transaction degradation.

Figure 21:
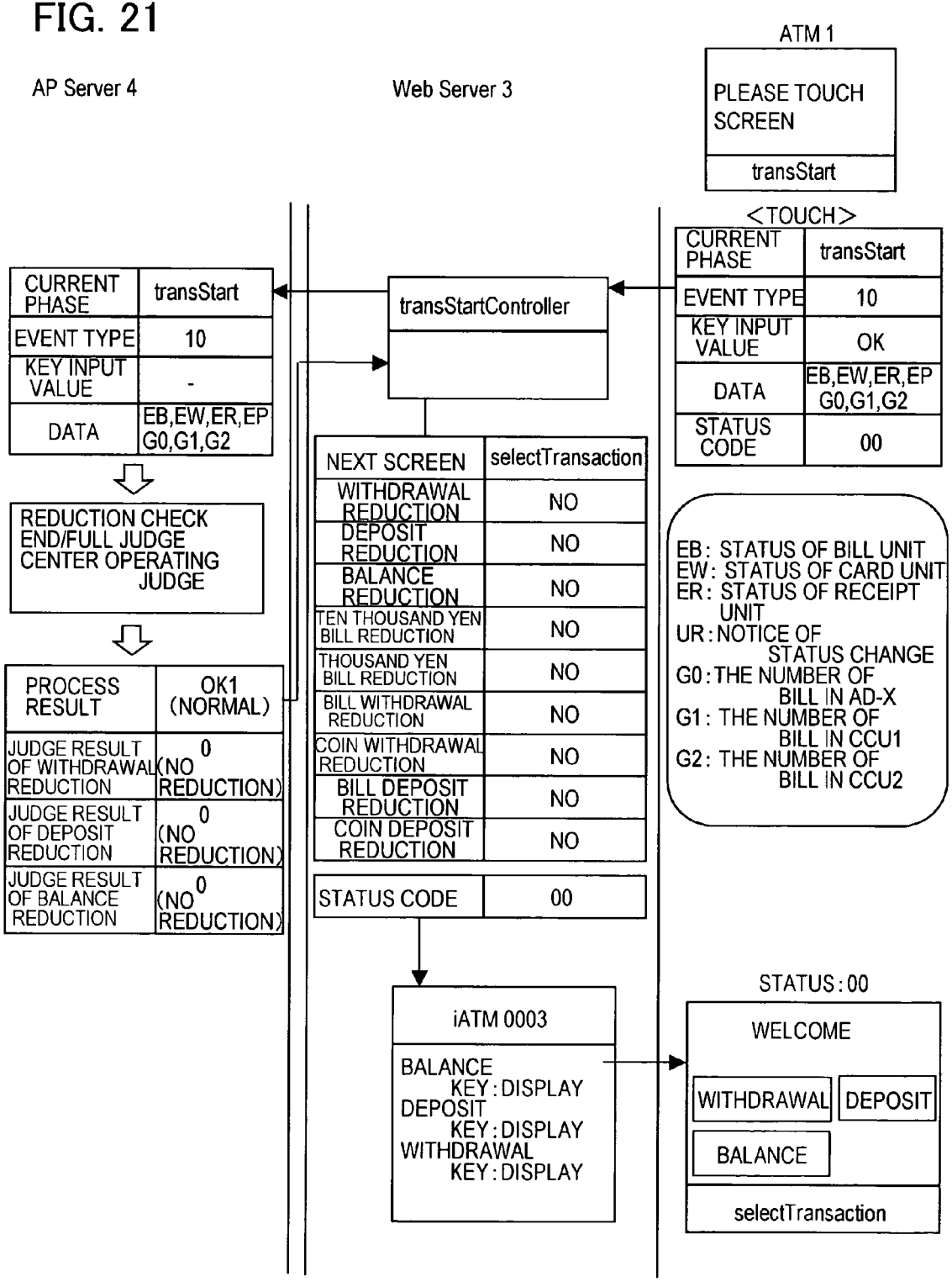
FIG. 21 is a sequence diagram of transaction degradation processing at the time of transaction initiation in the automated transaction apparatus of FIG. 14.
Figure 22:
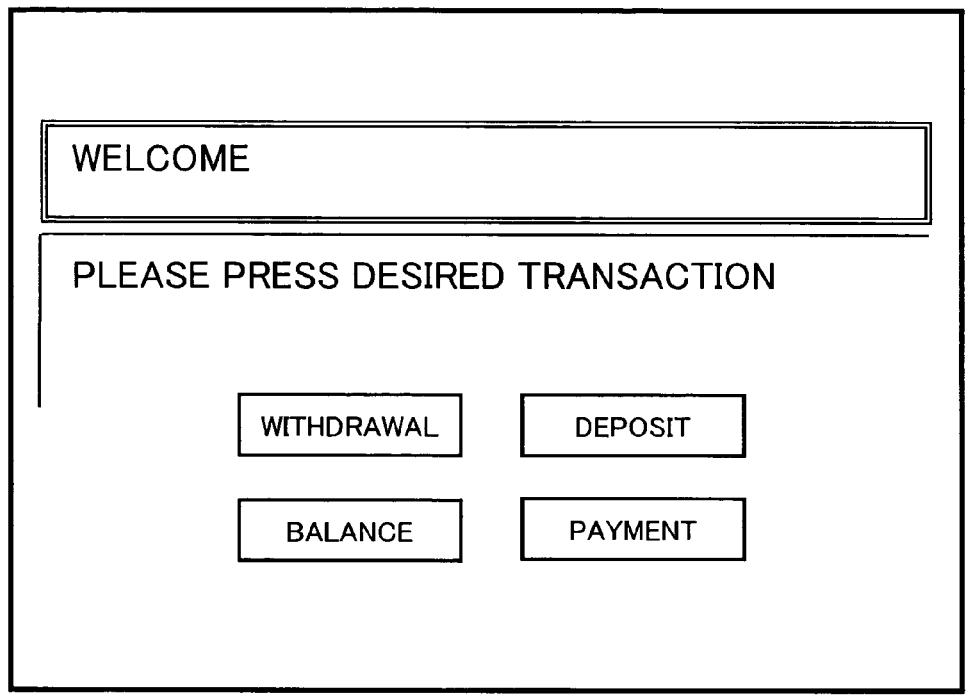
FIG. 22 is an explanatory diagram of the entire transaction selection screen of the automated transaction apparatus of FIG. 14.
Figure 23:
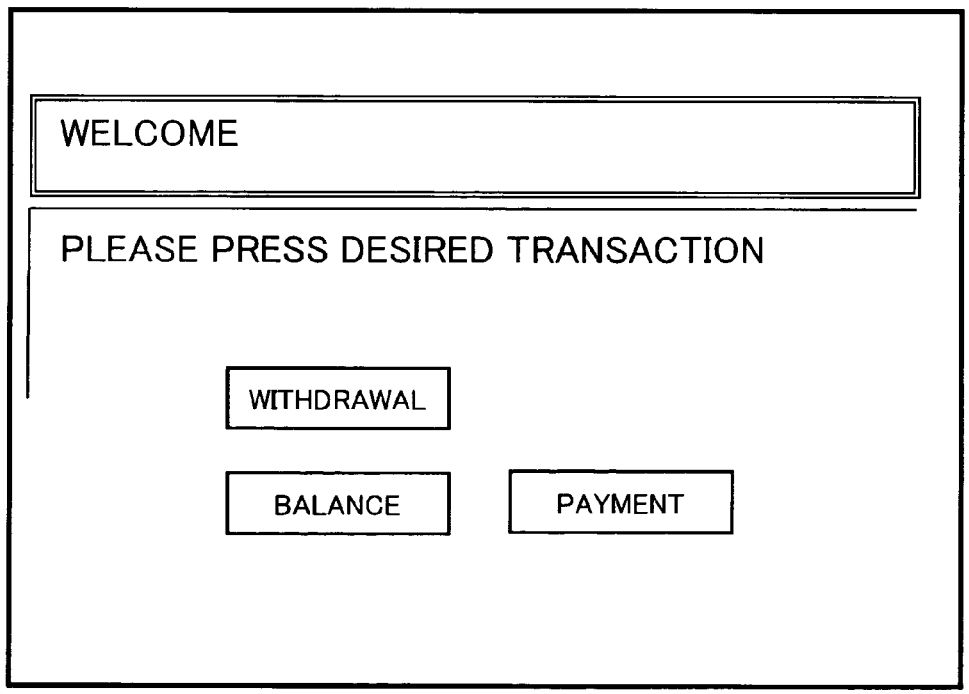
FIG. 23 is an explanatory diagram of the selection screen during transaction degradation of the automated transaction apparatus of FIG. 14; and, FIG. 24 is a drawing of the configuration of the automated transaction system of another aspect of the invention.

Next, transaction degradation processing by the business server 4 of an automated transaction system is explained, using FIG. 21 through FIG. 23. FIG. 21 is a sequence diagram of transaction degradation processing at the time of transaction initiation; FIG. 22 and FIG. 23 are explanatory diagrams of transaction degradation processing.

As shown in FIG. 21, at a wait screen displaying "Please touch the screen" on the UOP 16 of the ATM 1, when the customer touches the UOP 16, the transaction begins. First the ATM 1 notifies the Web server 3 of the client ID, event type, current phase (transaction initiation), data (apparatus state and media quantities), and similar.

In ATMs 1 with the configuration of FIG. 14 through FIG. 17, apparatus states include state information for paper currency devices 14, 15 (sensor information, residual information and similar) EB, state information EW for the card device 12, state information ER for the receipt device 19, and similar. Media information includes the quantities of 10,000-yen bills and 1000-yen bills G0 to G2 in the recycling portion (AD-X) and withdrawal portion.

The Web server 3 receives this information, starts the transaction start controller (program), and notifies the business server 4 of the current phase, event type, and data (apparatus states EB, EW, ER, media information G0 to G2).

As explained using FIG. 11, the business server 4 references the tables 60, 62, 64, 66 of the database 6 to perform transaction degradation checks, judges whether degradation has occurred for each transaction, and returns the degradation judgment results for each transaction to the Web server 3.

In the Web server 3, the transaction controller receives this information and creates the data for the next screen. That is, because the next screen is a transaction selection screen, whether degradation occurs is decided for each transaction (withdrawals, deposits, balance inquiries, and similar), a screen view to display keys on the next screen is created, and this is transmitted to the ATM 1 in HTTL (Hyper Text Transfer Language).

At the ATM 1, the browser views this data, and displays on the screen of the UOP 16 the transaction keys specified for display. FIG. 22 shows the transaction selection screen when all transactions can be performed. When as a result of degradation checks at the time of initiation of a transaction deposit transactions are degraded, the deposit key is erased, as shown in FIG. 23.

In this example also, similarly to the first aspect, by performing transaction degradation processing on the side of the server having a database, there is no longer a need for installation of programs and tables in a number equal to the number of ATM units, modification of the table specifications is facilitated, and program maintainability is improved.

Further, through unified management by the database server 6 of the bank host transaction service schedule and the unit states and media states of individual ATMs, a high level of maintainability, which is an advantage of database use, can be realized. And through adoption of a database, secondary utilization of data becomes possible, and retrieval and display of data by external systems is enabled.

Other Aspects

Figure 24:
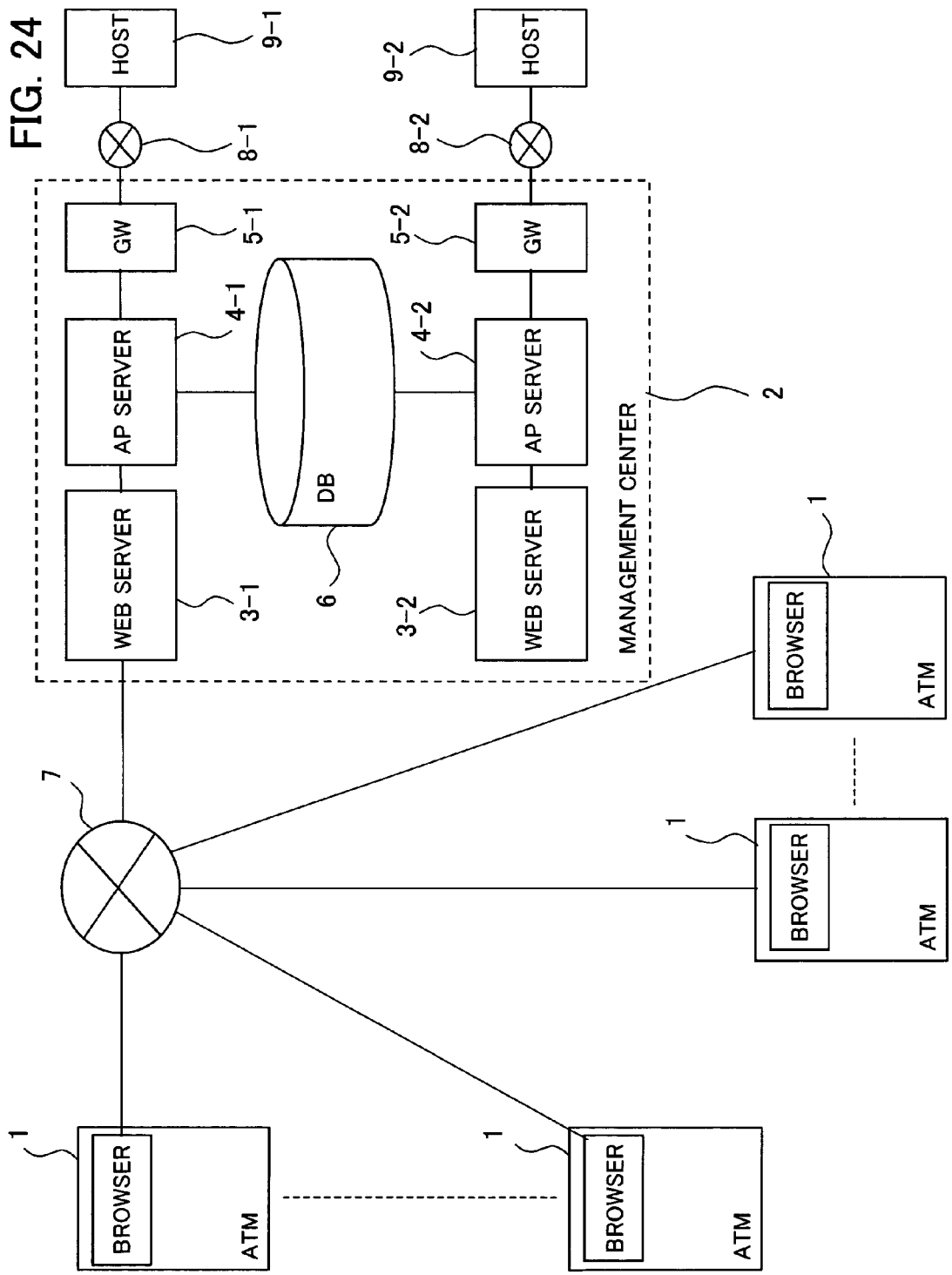

FIG. 24 shows the configuration of an automated transaction system of another aspect of this invention. In this example, the ATM system of a plurality of financial institutions is unified by an ATM operation center 2.

As shown in FIG. 24, each automated cash transaction apparatus installation (called an ATM) 1 is connected to the ATM operation center 2 via a network (for example, public circuits). The ATM operation center 2 is connected to financial institution host computers 9-1, 9-2 via the networks 8-1, 8-2, to relay transaction data.

This operation center 2 has ATM operation servers 4-1, 4-2 which exchange transaction data with the Web servers 3-1, 3-2 connected by the network 7, and with ATMs 1 through the Web servers 3-1, 3-2, and control and monitor operation; a shared database server 6 which stores various data used by the ATM operation servers 4-1, 4-2; and host gateways 5-1, 5-2 which connect the ATM operation servers 4-1, 4-2 and host computers 9-1, 9-2.

The database 6 has a center/store mode table 60 which stores operation modes for each transaction in the center/stores in which ATMs 1 are installed; a unit table 62 which stores degradation transactions according to the unit states of ATMs 1; a media table 64 which stores degradation transactions according to media states; and an end/full judgment condition table 66 which stores conditions used to judge end/full states based on state information from ATMs 1.

The operation servers 4-1, 4-2 use the tables 60, 62, 64, 66 to perform transaction degradation checks according to the state information from ATMs 1, and send the results to the ATMs 1. By this means, degraded operation based on a common database can be performed by a plurality of financial institution hosts, regardless of data paths.

In the above-described aspects, automated cash transaction apparatus was employed as an example of automated transaction apparatus; but application to cash payment apparatus, cash deposit apparatus, cash lending apparatus and similar apparatus which handles cash is also possible.

Aspects of this invention have been explained above, but this invention can be variously modified within the technical scope of the invention, and such modifications are not excluded from the scope of the invention.

As explained above, by performing transaction degradation processing on the side of a server having a database, there is no longer a need for installation of programs and tables in a number equal to the number of ATM units, modification of the table specifications is facilitated, and program maintainability is improved.

Further, through unified management using a database of the transaction service schedule of the financial institution host and of the unit state and media state of each ATM, a high level of maintainability, which is an advantage of database use, can be realized. This is extremely advantageous in the cases of independent ATMs installed in unmanned locations, convenience stores and similar.

What is claimed is:

1. A transaction degradation processing method for an automated transaction apparatus, which executes a transaction specified by operations by a customer among a plurality of transactions, comprising:

transmitting a state of said automated transaction apparatus from said automated transaction apparatus to an administration server which administers a plurality of installations of said automated transaction apparatus;

making decisions of available transactions of said automated transaction apparatus according to the state of said automated transaction apparatus, referencing administrative information stored in a database of said administration server;

transmitting said decisions of available transactions to said automated transaction apparatus; wherein said transmitting a state further comprises transmitting state information for units handling media in said automated transaction apparatus and state information for said media, and said making decisions further comprises deciding available transactions of said automated transaction apparatus according to said unit state information and said media state information.

2. The transaction degradation processing method for automated transaction apparatus according to claim 1, further comprising transmitting the state of said automated transaction apparatus when said customer instructs said automated transaction apparatus to initiate a transaction by operating a customer operation unit of the automated transaction apparatus.

3. The transaction degradation processing method for automated transaction apparatus according to claim 1, wherein said making decisions further comprises:
deciding, based on state information of said media, whether a transaction using said media can be executed.

4. The transaction degradation processing method for automated transaction apparatus according to claim 1, wherein said making decisions further comprises:
deciding said available transactions, referring to a table indicating available transactions according to state information for said units and state information for said media, stored in said database.

5. The transaction degradation processing method for automated transaction apparatus according to claim 1, wherein said making decisions further comprises:
judging, from said media state information, whether operations using said media are possible; and
deciding said available transactions by using said judgment results to reference a table indicating available transactions according to said judgment results.

6. The transaction degradation processing method for automated transaction apparatus according to claim 1, further comprising displaying said available transactions on a transaction selection screen of said automated transaction apparatus.

7. The transaction degradation processing method for automated transaction apparatus according to claim 1, wherein said transmission step comprises transmitting quantity information for transaction recording media in said automated transaction apparatus and for cash in said automated transaction apparatus.

8. An automated transaction system, comprising:
a plurality of automated transaction apparatus, each executing a transaction specified by operations by a customer among a plurality of transactions and transmitting state information for units handling media in said automated transaction apparatus and state information for said media,
an administration server which administers said plurality of automated transaction apparatus; and
a database which stores operation information for said automated transaction apparatus,
wherein said administration server decides the available transactions of said automated transaction apparatus according to said unit state information and said media state information transmitted from said automated transaction apparatus, referencing operation information stored in said database, and transmits said decision of available transactions to said automated transaction apparatus.

9. The automated transaction system according to claim 8, wherein said automated transaction apparatus transmits the state of said automated transaction apparatus when said customer instructs said automated transaction apparatus to initiate a transaction by operating customer operation unit of the automated transaction apparatus.

10. The automated transaction system according to claim 8, wherein said administration server decides, based on said media state information, whether transactions using said media can be executed.

11. The automated transaction system according to claim 8, wherein said administration server decides said available transactions, referencing a table indicating available transactions according to state information for said units and state information for said media, stored in said database.

12. The automated transaction system according to claim 8, wherein said administration server judges, based on state information for said media, whether operations using said media are possible, and decides said available transactions by using said judgment results to reference a table indicating available transactions according to said judgment results.

13. The automated transaction system according to claim 8, wherein said automated transaction apparatus displays said available transactions on a transaction selection screen.

14. The automated transaction system according to claim 8, wherein said automated transaction apparatus transmits quantity information for transaction recording media and for cash in said automated transaction apparatus.

15. An administration server for automated transaction apparatus, comprising:
a database to store operation information for a plurality of installations of automated transaction apparatus, each of which executes a transaction specified by operations by a customer among a plurality of transactions; and
a server receiving state information for units which handle media in said automated transaction apparatus and state information for said media, and which performs administration of said plurality of installations of automated transaction apparatus,
wherein said server decides the available transactions for said automated transaction apparatus based on the state of said automated transaction apparatus transmitted from said automated transaction apparatus, referencing operation information stored in said database, and transmits said decisions of available transactions to said automated transaction apparatus.

16. The administration server for automated transaction apparatus according to claim 15, wherein said server receives the state of said automated transaction apparatus from said automated transaction apparatus when said customer instructs said automated transaction apparatus to initiate a transaction, and starts to decide said available transactions.

17. The administration server according to claim 15, wherein said server decides, based on said media state information, whether a transaction which uses said media can be executed.

18. The administration server according to claim 15, wherein said server decides said available transactions by referencing a table indicating available transactions according to state information for said units and state information for said media, stored in said database.

19. The administration server according to claim 15, wherein said server judges, based on state information for said media, whether an operations which uses said media is possible, and uses said judgment results to reference a table indicating available transactions according to said judgment results, and stored in said database, to decide said available transactions.

20. The administration server according to claim 15, wherein said server transmits data for display of said available transactions on a transaction selection screen of said automated transaction apparatus.

21. The administration server according to claim 15, wherein said server receives quantity information for transaction recording media and for cash in said automated transaction apparatus.

* * * * *

UNITED STATES PATENT AND TRADEMARK OFFICE
CERTIFICATE OF CORRECTION

PATENT NO.         : 7,234,635 B2                                   Page 1 of 1
APPLICATION NO.    : 10/984800
DATED              : June 26, 2007
INVENTOR(S)        : Shinichiro Tsuchiya et al.

It is certified that error appears in the above-identified patent and that said Letters Patent is hereby corrected as shown below:

Column 17, Line 59, after "operating" insert --a--.

Signed and Sealed this

Thirteenth Day of November, 2007

JON W. DUDAS
*Director of the United States Patent and Trademark Office*